(12) United States Patent
Cross et al.

(10) Patent No.: US 9,554,620 B2
(45) Date of Patent: *Jan. 31, 2017

(54) AUXETIC SOLES WITH CORRESPONDING INNER OR OUTER LINERS

(71) Applicant: NIKE, Inc., Beaverton, OR (US)

(72) Inventors: Tory M. Cross, Portland, OR (US);
Kevin W. Hoffer, Portland, OR (US);
David P. Jones, Beaverton, OR (US);
Patrick B. Kirschner, Beaverton, OR (US); Elizabeth Langvin, Sherwood, OR (US); James C. Meschter, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/643,254

(22) Filed: Mar. 10, 2015

(65) Prior Publication Data
US 2015/0245683 A1   Sep. 3, 2015

Related U.S. Application Data

(63) Continuation-in-part of application No. 14/030,002, filed on Sep. 18, 2013, now Pat. No. 9,402,439.

(51) Int. Cl.
*A43B 13/02* (2006.01)
*A43B 13/04* (2006.01)
(Continued)

(52) U.S. Cl.
CPC ............ *A43B 13/023* (2013.01); *A43B 1/0009* (2013.01); *A43B 3/0073* (2013.01); *A43B 5/00* (2013.01);
(Continued)

(58) Field of Classification Search
CPC ....... A63C 13/003; A63C 13/006; A43B 3/16;
A43B 13/02; A43B 13/122; A43B 13/181;
A43B 13/187; A43B 13/188; A43B 1/009;
A43B 5/00; A43C 15/00; A43C 15/02; A43C 15/065; A43C 15/068
(Continued)

(56) References Cited

U.S. PATENT DOCUMENTS

| 503,062 A | 8/1893 | Norwood |
|---|---|---|
| 1,733,733 A | 10/1929 | Hess |

(Continued)

FOREIGN PATENT DOCUMENTS

| CN | 2870531 Y | 2/2007 |
|---|---|---|
| CN | 101677651 A2 | 3/2010 |

(Continued)

OTHER PUBLICATIONS

International Search Report and Written Opinion mailed Oct. 14, 2015 in PCT/US2015/038958.
(Continued)

*Primary Examiner* — Shaun R Hurley
*Assistant Examiner* — Bao-Thieu L Nguyen
(74) *Attorney, Agent, or Firm* — Quinn Law Group, PLLC

(57) ABSTRACT

A material that includes at least one layer made of an auxetic structure and articles of footwear having soles comprising the materials. When the material is under tension, it expands in both the direction under tension and in the directional orthogonal to the direction under tension. The articles of footwear have soles that have at least one layer made of a material that has a pattern of sole elements with apertures. The sole elements have may rotate with respect to each other when the sole is under lateral or longitudinal tension, thus increasing the lateral and longitudinal dimensions of the sole. One or more auxetic or flat liners may be used to prevent entry of debris into the apertures.

20 Claims, 19 Drawing Sheets

(51) Int. Cl.

| | | |
|---|---|---|
| *A43B 1/00* | (2006.01) | |
| *A43B 3/00* | (2006.01) | |
| *A43B 5/00* | (2006.01) | |
| *A43B 13/12* | (2006.01) | |
| *A43B 13/18* | (2006.01) | |
| *B32B 3/26* | (2006.01) | |
| *B32B 27/06* | (2006.01) | |
| *B32B 27/30* | (2006.01) | |
| *B32B 3/12* | (2006.01) | |
| *A43B 13/14* | (2006.01) | |

(52) U.S. Cl.
CPC ............... *A43B 13/02* (2013.01); *A43B 13/04* (2013.01); *A43B 13/122* (2013.01); *A43B 13/14* (2013.01); *A43B 13/181* (2013.01); *A43B 13/187* (2013.01); *A43B 13/188* (2013.01); *B32B 3/12* (2013.01); *B32B 3/266* (2013.01); *B32B 27/065* (2013.01); *B32B 27/304* (2013.01); *B32B 2307/51* (2013.01); *B32B 2307/554* (2013.01); *B32B 2307/558* (2013.01); *B32B 2307/584* (2013.01); *B32B 2437/02* (2013.01)

(58) Field of Classification Search
USPC ... 36/159, 160, 97, 1, 7.5, 7.6, 45, 112–115, 36/131, 132, 103
See application file for complete search history.

(56) References Cited

U.S. PATENT DOCUMENTS

| | | | |
|---|---|---|---|
| 2,251,468 A | 8/1941 | Smith | |
| 2,432,533 A | 12/1947 | Margolin | |
| 2,580,840 A | 1/1952 | Rogndal | |
| 2,963,722 A | 12/1960 | Stix | |
| 3,626,532 A | 12/1971 | Smith | |
| 3,745,600 A | 7/1973 | Rubico et al. | |
| 3,757,436 A | 9/1973 | Winkler et al. | |
| 4,050,108 A | 9/1977 | Londner | |
| 4,272,850 A | 6/1981 | Rule | |
| 4,340,626 A | 7/1982 | Rudy | |
| 4,484,398 A | 11/1984 | Goodwin et al. | |
| 4,668,557 A | 5/1987 | Lakes | |
| 4,756,098 A | 7/1988 | Boggia | |
| 4,858,340 A | 8/1989 | Pasternak | |
| 4,899,412 A | 2/1990 | Ganon | |
| 4,967,492 A | 11/1990 | Rosen | |
| 4,999,931 A | 3/1991 | Vermeulen | |
| 5,060,402 A | 10/1991 | Rosen | |
| D339,459 S | 9/1993 | Yoshikawa et al. | |
| D344,170 S | 2/1994 | Acoff | |
| 5,469,639 A | 11/1995 | Sessa | |
| 5,718,064 A | 2/1998 | Pyle | |
| 5,813,146 A | 9/1998 | Gutkowski et al. | |
| 5,918,338 A | 7/1999 | Wong | |
| D420,786 S | 2/2000 | Ramer et al. | |
| 6,151,804 A | 11/2000 | Hieblinger | |
| 6,178,662 B1 | 1/2001 | Legatzke | |
| 6,226,896 B1 | 5/2001 | Friton | |
| 6,357,146 B1 | 3/2002 | Wordsworth et al. | |
| 6,412,593 B1 | 7/2002 | Jones | |
| 6,487,795 B1 | 12/2002 | Ellis, III | |
| 6,564,476 B1 | 5/2003 | Hernandez | |
| D487,614 S | 3/2004 | Le | |
| D488,916 S | 4/2004 | McClaskie | |
| 6,862,820 B2 | 3/2005 | Farys et al. | |
| 7,132,032 B2 | 11/2006 | Tawney et al. | |
| 7,160,621 B2 | 1/2007 | Chaudhari et al. | |
| 7,252,870 B2 | 8/2007 | Anderson et al. | |
| 7,254,906 B2 | 8/2007 | Morris et al. | |
| 7,310,894 B1 | 12/2007 | Schwarzman et al. | |
| D571,543 S | 6/2008 | Sungadi | |
| 7,455,567 B2 | 11/2008 | Bentham et al. | |
| 7,487,602 B2 | 2/2009 | Berger et al. | |
| 7,546,698 B2 | 6/2009 | Meschter | |
| 7,574,818 B2 | 8/2009 | Meschter | |
| D614,382 S | 4/2010 | Grenet et al. | |
| 7,770,307 B2 | 8/2010 | Meschter | |
| 7,797,856 B2 * | 9/2010 | Andrews | A43B 13/12 36/25 R |
| 7,814,852 B2 | 10/2010 | Meschter | |
| 7,827,703 B2 | 11/2010 | Geer et al. | |
| 7,870,681 B2 | 1/2011 | Meschter | |
| 7,870,682 B2 | 1/2011 | Meschter et al. | |
| 7,910,193 B2 * | 3/2011 | Ma | A47C 23/002 428/218 |
| 8,002,879 B2 | 8/2011 | Hook | |
| 8,084,117 B2 * | 12/2011 | Lalvani | B32B 3/266 428/135 |
| D653,844 S | 2/2012 | Smith | |
| 8,122,616 B2 | 2/2012 | Meschter et al. | |
| 8,132,340 B2 | 3/2012 | Meschter | |
| 8,186,078 B2 | 5/2012 | Avar et al. | |
| 8,196,316 B2 | 6/2012 | Cook et al. | |
| 8,209,883 B2 * | 7/2012 | Lyden | A43B 1/0081 2/239 |
| 8,220,072 B2 | 7/2012 | Dodd | |
| 8,225,530 B2 | 7/2012 | Sokolowski et al. | |
| 8,266,827 B2 | 9/2012 | Dojan et al. | |
| 8,276,294 B2 | 10/2012 | Polegato Moretti | |
| 8,277,719 B2 | 10/2012 | Alderson et al. | |
| 8,312,645 B2 | 11/2012 | Dojan et al. | |
| 8,322,050 B2 | 12/2012 | Lubart | |
| 8,343,404 B2 | 1/2013 | Meli et al. | |
| 8,388,791 B2 | 3/2013 | Dojan et al. | |
| 8,490,299 B2 | 7/2013 | Dua et al. | |
| 8,516,723 B2 | 8/2013 | Ferrigan et al. | |
| 8,544,197 B2 | 10/2013 | Spanks et al. | |
| 8,544,515 B2 * | 10/2013 | Ma | B60O 7/14 152/151 |
| 8,631,589 B2 | 1/2014 | Dojan | |
| 8,661,564 B2 | 3/2014 | Dodd | |
| 8,732,982 B2 | 5/2014 | Sullivan et al. | |
| D707,934 S | 7/2014 | Petrie | |
| D716,027 S | 10/2014 | Kirschner | |
| D717,034 S | 11/2014 | Bramani | |
| 8,883,287 B2 * | 11/2014 | Boyce | B29C 59/02 174/254 |
| 8,961,733 B2 | 2/2015 | Dodd | |
| 2002/0166262 A1 | 11/2002 | Hernandez | |
| 2004/0181972 A1 | 9/2004 | Csorba | |
| 2007/0213838 A1 | 9/2007 | Hengelmolen | |
| 2007/0240333 A1 | 10/2007 | Le et al. | |
| 2008/0011021 A1 | 1/2008 | Starbuck et al. | |
| 2008/0216357 A1 | 9/2008 | Fogg et al. | |
| 2008/0250673 A1 | 10/2008 | Andrews et al. | |
| 2008/0289214 A1 | 11/2008 | Aveni | |
| 2009/0064536 A1 * | 3/2009 | Klassen | A43B 13/181 36/27 |
| 2009/0064540 A1 | 3/2009 | Sokolowski et al. | |
| 2009/0119820 A1 | 5/2009 | Bentham et al. | |
| 2009/0151195 A1 | 6/2009 | Forstrom et al. | |
| 2009/0178301 A1 | 7/2009 | Dojan et al. | |
| 2009/0183392 A1 | 7/2009 | Shane | |
| 2009/0276933 A1 | 11/2009 | Dodd | |
| 2009/0307932 A1 | 12/2009 | Kirby et al. | |
| 2010/0029796 A1 | 2/2010 | Alderson et al. | |
| 2010/0043255 A1 | 2/2010 | Trevino | |
| 2010/0095551 A1 * | 4/2010 | Gupta | A43B 7/144 36/29 |
| 2010/0126041 A1 | 5/2010 | Francis | |
| 2010/0139122 A1 | 6/2010 | Zanatta | |
| 2010/0170117 A1 | 7/2010 | Kim | |
| 2010/0236098 A1 | 9/2010 | Morgan | |
| 2011/0099845 A1 | 5/2011 | Miller | |
| 2011/0119956 A1 | 5/2011 | Borel et al. | |
| 2011/0168313 A1 | 7/2011 | Ma et al. | |
| 2011/0192056 A1 | 8/2011 | Geser et al. | |
| 2011/0247237 A1 | 10/2011 | Jara et al. | |
| 2011/0247240 A1 | 10/2011 | Eder et al. | |
| 2012/0021167 A1 | 1/2012 | Plant | |

(56) References Cited

U.S. PATENT DOCUMENTS

| | | |
|---|---|---|
| 2012/0023686 A1 | 2/2012 | Huffa et al. |
| 2012/0117826 A1 | 5/2012 | Jarvis |
| 2012/0124861 A1 | 5/2012 | Losani |
| 2012/0124865 A1 | 5/2012 | Opie et al. |
| 2012/0129416 A1 | 5/2012 | Anand et al. |
| 2012/0159810 A1 | 6/2012 | Klassen |
| 2012/0174432 A1 | 7/2012 | Peyton |
| 2012/0181896 A1 | 7/2012 | Kornbluh et al. |
| 2012/0198720 A1 | 8/2012 | Farris et al. |
| 2012/0210607 A1 | 8/2012 | Avar et al. |
| 2012/0233878 A1 | 9/2012 | Hazenberg et al. |
| 2012/0266492 A1 | 10/2012 | Youngs et al. |
| 2012/0272550 A1 | 11/2012 | Parce |
| 2012/0315456 A1 | 12/2012 | Scarpa et al. |
| 2013/0000152 A1 | 1/2013 | Cooper et al. |
| 2013/0071583 A1 | 3/2013 | Evans et al. |
| 2013/0081305 A1 | 4/2013 | Byrne |
| 2013/0104428 A1 | 5/2013 | O'Brien et al. |
| 2013/0160324 A1 | 6/2013 | Peyton et al. |
| 2013/0160328 A1 | 6/2013 | Hatfield et al. |
| 2013/0219636 A1 | 8/2013 | Dojan et al. |
| 2013/0239444 A1 | 9/2013 | Polegato Moretti |
| 2013/0276333 A1 | 10/2013 | Wawrousek et al. |
| 2013/0284732 A1 | 10/2013 | Van Schaftingen |
| 2013/0322955 A1* | 12/2013 | Ma .................. E04B 1/1903 403/53 |
| 2013/0340288 A1 | 12/2013 | Baker et al. |
| 2014/0053311 A1 | 2/2014 | Nordstrom et al. |
| 2014/0053312 A1 | 2/2014 | Nordstrom et al. |
| 2014/0059734 A1 | 3/2014 | Toronjo |
| 2014/0090271 A1* | 4/2014 | Hoffer .................. A43B 1/0009 36/29 |
| 2014/0101816 A1 | 4/2014 | Toronjo |
| 2014/0157631 A1 | 6/2014 | Dodd |
| 2014/0165427 A1 | 6/2014 | Molyneux et al. |
| 2014/0173938 A1 | 6/2014 | Beye et al. |
| 2014/0237850 A1 | 8/2014 | Hull |
| 2014/0260281 A1 | 9/2014 | Innes |
| 2015/0075033 A1 | 3/2015 | Cross et al. |
| 2015/0075034 A1 | 3/2015 | Cross et al. |
| 2015/0289584 A1* | 10/2015 | Nurse .................. A43B 3/0031 36/89 |

FOREIGN PATENT DOCUMENTS

| | | |
|---|---|---|
| GB | 2 147 792 A | 5/1985 |
| GB | 2 455 167 A | 6/2009 |
| GB | 2 463 446 A | 3/2010 |
| JP | 2005-143637 A | 6/2005 |
| KR | 101165793 B1 | 7/2012 |
| TW | 201231283 A | 8/2012 |
| WO | 03/022085 A2 | 3/2003 |
| WO | 2007022338 A1 | 2/2007 |
| WO | 2007/052054 A1 | 5/2007 |
| WO | 2012/171911 A1 | 12/2012 |
| WO | 2014187970 | 11/2014 |
| WO | 2015/041796 A1 | 3/2015 |
| WO | 2016007205 A1 | 1/2016 |
| WO | 2016032626 A1 | 3/2016 |

OTHER PUBLICATIONS

International Search Report and Written Opinion mailed Dec. 4, 2014 in PCT/US2014/052038.
Office Action mailed Mar. 26, 2015 in U.S. Appl. No. 14/030,002.
International Search Report and Written Opinion mailed Mar. 18, 2016 in PCT Application No. PCTUS2015/066901.
International Search Report and Written Opinion mailed Mar. 18, 2016 in PCT Application No. PCTUS2015/066913.
International Preliminary Report on Patentability (including Written Opinion of the ISA) dated Mar. 22, 2016 in PCT Application No. PCTUS2014/052038.
International Search Report and Written Opinion mailed Mar. 18, 2016 in PCT Application No. PCTUS2015/066905.
International Search Report and Written Opinion mailed Apr. 6, 2016 in PCT Application No. PCTUS2015/066883.
International Search Report and Written Opinion mailed Apr. 6, 2016 in PCT Application No. PCTUS2015/066923.
International Search Report and Written Opinion mailed Apr. 13, 2016 in PCT Application No. PCTUS2015/066895.
Taiwanese Office Action dated Mar. 1, 2016 in Taiwanese Patent Application No. 103131046.
International Search Report and Written Opinion mailed Nov. 17, 2015 in PCT/US2015/040523.

\* cited by examiner

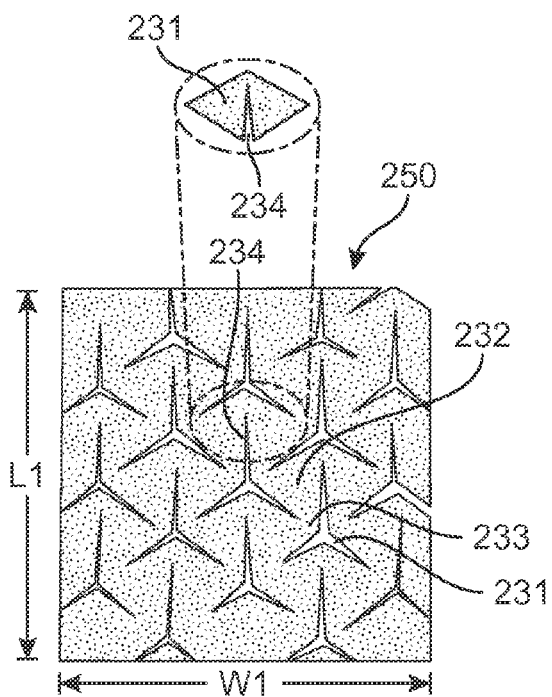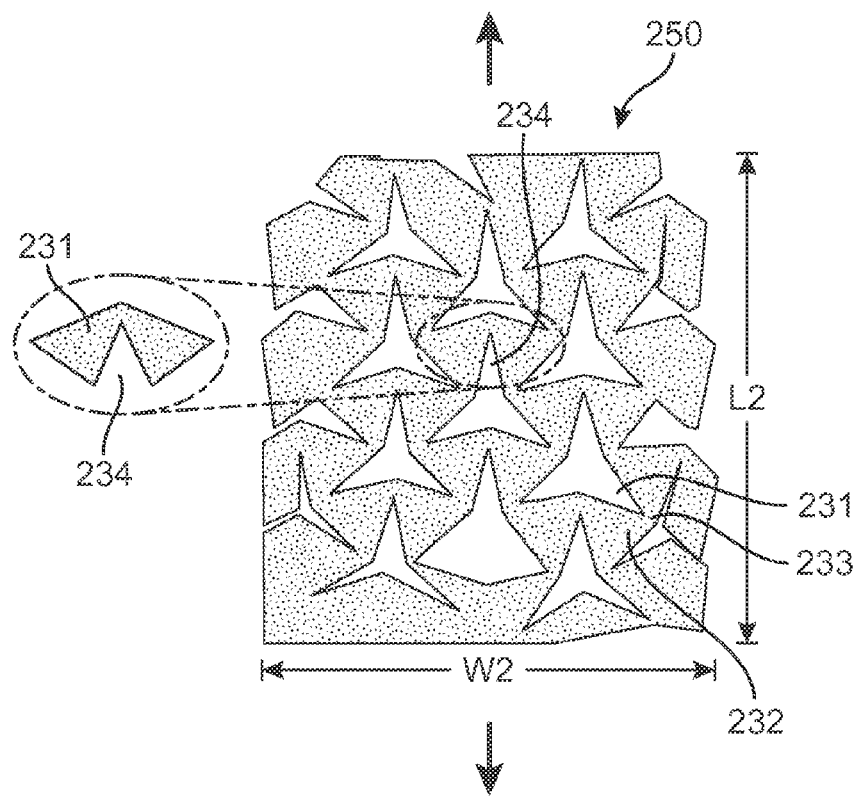
FIG. 2

AUXETIC SOLES WITH CORRESPONDING INNER OR OUTER LINERS

REFERENCE TO RELATED APPLICATIONS

This application is a Continuation-In-Part Application of U.S. patent application Ser. No. 14/030,022, filed Sep. 18, 2013 and entitled "Auxetic Structures and Footwear with Soles Having Auxetic Structures" ("the '022 application") which is incorporated by reference herein in its entirety, and claims priority to that application.

BACKGROUND

Articles of footwear typically have at least two major components, an upper that provides the enclosure for receiving the wearer's foot, and a sole secured to the upper that is the primary contact to the ground or playing surface. The footwear may also use some type of fastening system, for example, laces or straps or a combination of both, to secure the footwear around the wearer's foot. The sole may comprise three layers—an inner sole, a midsole and an outer sole. The outer sole is the primary contact to the ground or the playing surface. It generally carries a tread pattern and/or cleats or spikes or other protuberances that provide the wearer of the footwear with improved traction suitable to the particular athletic, work or recreational activity, or to a particular ground surface.

SUMMARY

As used herein, the term "auxetic structure" generally refers to a structure that, when it is placed under tension in a first direction, increases its dimensions in a direction that is orthogonal to the first direction. For example, if the structure can be described as having a length, a width and a thickness, then when the structure is under tension longitudinally, it increases in width. In certain of the embodiments, the auxetic structures are bi-directional such that they increase in length and width when stretched longitudinally and in width and length when stretched laterally, but do not increase in thickness. Such auxetic structures are characterized by having a negative Poisson's ratio. Also, although such structures will generally have at least a monotonic relationship between the applied tension and the increase in the dimension orthogonal to the direction of the tension, that relationship need not be proportional or linear, and in general need only increase in response to increased tension.

Generally, an article of footwear includes an upper and a sole. The sole may include an inner sole, a midsole and an outer sole. Embodiments of the sole include at least one layer made of an auxetic structure. This layer can be referred to as an "auxetic layer." When the person wearing the footwear engages in an activity, such as running, turning, leaping or accelerating, that puts the auxetic layer under increased longitudinal or lateral tension, the auxetic layer increases its length and width and thus provides improved traction, as well as absorbing some of the impact with the playing surface. Although the descriptions below only discuss a limited number of types of footwear, embodiments can be adapted for many sport and recreational activities, including tennis and other racquet sports, walking, jogging, running, hiking, handball, training, running or walking on a treadmill, as well as team sports such as basketball, volleyball, lacrosse, field hockey and soccer.

In one aspect, an embodiment of an article of footwear has a sole structure with an auxetic layer and a liner. The auxetic layer includes a pattern of apertures formed by sole elements surrounding the apertures. Each of the sole elements has a number of vertices. The sole elements are joined at their vertices, such that the sole elements can rotate with respect to one another about their vertices. The auxetic layer is characterized by having a lateral direction, a longitudinal direction and a vertical direction. The auxetic layer is configured to expand in the lateral direction and in the longitudinal direction when tension is applied to the auxetic layer in the lateral direction, and to expand in the lateral direction and the longitudinal direction when tension is applied to the auxetic layer in the longitudinal direction. The liner is disposed adjacent to and approximately parallel to the auxetic layer. The liner thus inhibits the introduction of debris into the apertures in the auxetic layer.

In another aspect, an embodiment of an article of footwear has an auxetic layer and an auxetic liner. The auxetic layer includes a pattern of apertures formed by geometric features surrounding the apertures, and each of the geometric features has a number of vertices. The geometric features are joined at their vertices such that the vertices function as hinges that allow the geometric features to rotate with respect to each other. The auxetic layer and the auxetic liner are characterized by having a lateral direction, a longitudinal direction and a vertical direction. When a portion of the auxetic layer is under lateral tension, it expands in both the lateral direction and the longitudinal direction, and when a portion of the auxetic layer is under longitudinal tension it expands in both the longitudinal direction and the lateral direction. Also, when a portion of the auxetic liner is under lateral tension, it expands in both the lateral direction and the longitudinal direction, and when a portion of the auxetic liner is under longitudinal tension it expands in both the longitudinal direction and the lateral direction. The auxetic liner is disposed on a first surface of the auxetic layer and mates with the auxetic layer.

In another aspect, an embodiment of an article of footwear has an upper and a sole structure attached to the upper. The sole structure has an auxetic layer and a first liner. The auxetic layer has a pattern of apertures formed by geometric features surrounding the apertures. The geometric features are joined at their vertices such that they function as hinges thereby allowing the geometric features to rotate with respect to each other. The auxetic layer is characterized by having a lateral dimension and a longitudinal dimension. When the auxetic layer is in an unstressed state, the auxetic layer is characterized by having an unstressed configuration with an unstressed longitudinal dimension and an unstressed lateral dimension, and when the auxetic layer is under tension, the auxetic layer has an expanded configuration with an expanded longitudinal dimension and an expanded lateral dimension, wherein the expanded longitudinal dimension is greater than the unstressed longitudinal dimension and wherein the expanded lateral dimension is greater than the unstressed lateral dimension. When the auxetic layer is under tension, the first liner expands simultaneously with the auxetic layer such that the expansion of the first liner is compatible with the expansion of the auxetic layer.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 2 is a schematic diagram illustrating the behavior of auxetic materials when tension is applied in a given direction;

DETAILED DESCRIPTION

For clarity, the detailed descriptions herein describe certain exemplary embodiments, but the disclosure herein may be applied to any article of footwear comprising certain of the features described herein and recited in the claims. In particular, although the following detailed description discusses exemplary embodiments, in the form of footwear such as running shoes, jogging shoes, tennis, squash or racquetball shoes, basketball shoes, sandals and flippers, the disclosures herein may be applied to a wide range of footwear.

For consistency and convenience, directional adjectives are employed throughout this detailed description corresponding to the illustrated embodiments. The term "longitudinal direction" as used throughout this detailed description and in the claims refers to a direction extending a length (or longest dimension) of an article of footwear such as a sports or recreational shoe. Also, the term "lateral direction" as used throughout this detailed description and in the claims refers to a direction extending along a width of an article of footwear. The lateral direction may generally be perpendicular to the longitudinal direction. The term "vertical direction" as used with respect to an article of footwear throughout this detailed description and in the claims refers to the direction that is normal to the plane of the sole of the article of footwear.

The term "sole structure", also referred to as simply as "sole", herein shall refer to any combination of insole, midsole, outsole and/or liners that provides support for a wearer's foot and bears the surface that is in direct contact with the ground or playing surface, such as a single sole; a combination of an outsole and an inner sole; a combination of an outsole, a midsole and an inner sole, and a combination of one or more liners, an outsole, a midsole and/or an inner sole.

Figure 1:
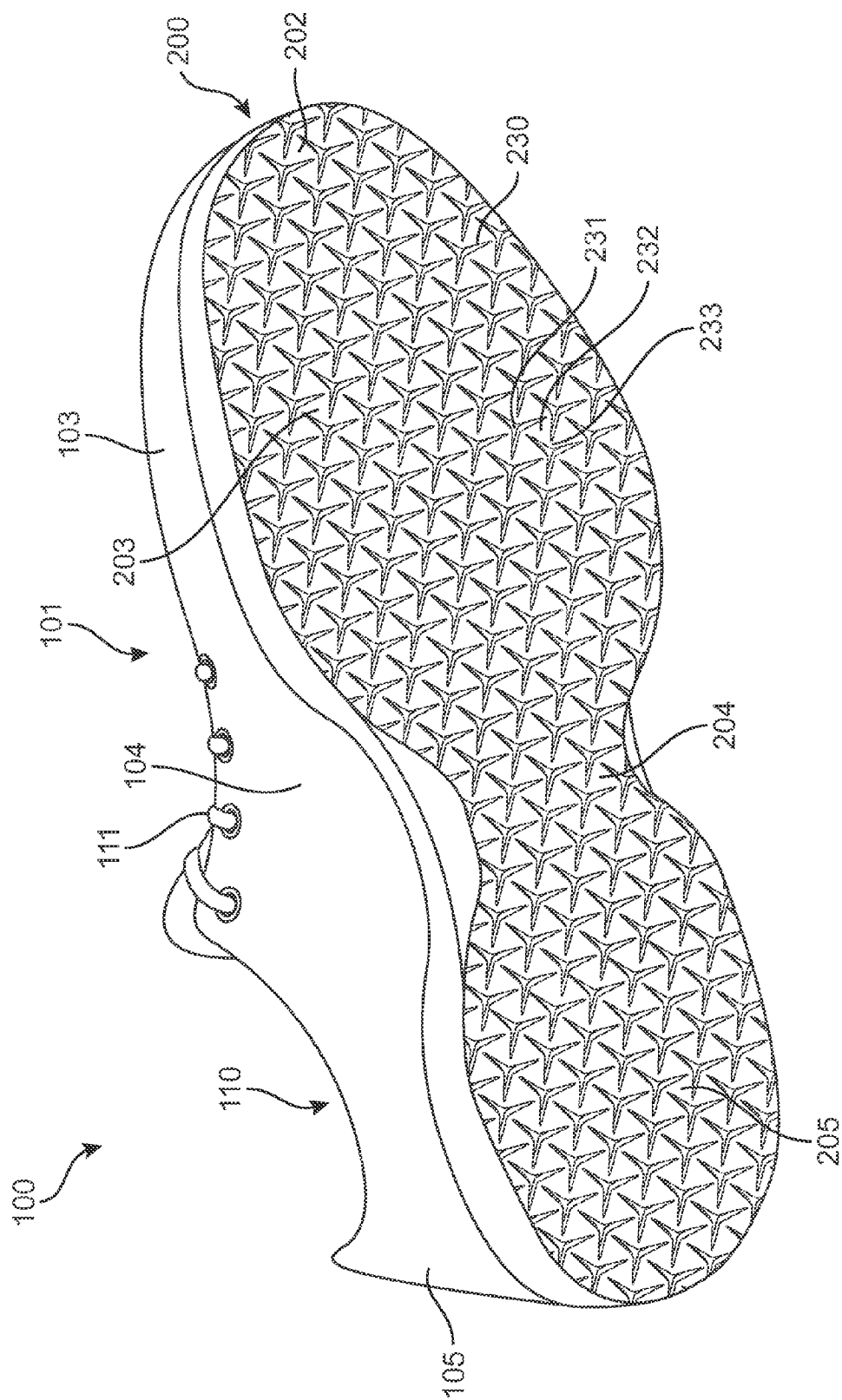
FIG. 1 is a schematic diagram of a bottom view of an embodiment of an article of footwear with an example of a sole that has an auxetic structure.

FIG. 1 is a bottom perspective view of an embodiment of an article of footwear 100. Article of footwear 100 may include upper 101 and sole structure 200, also referred to hereafter simply as sole 200. Upper 101 has a heel region 105, an instep or midfoot region 104 and a forefoot region 103. Upper 101 may include an opening or throat 110 that allows the wearer to insert his or her foot into the footwear. In some embodiments, upper 101 may also include laces 111, which can be used to tighten or otherwise adjust upper 101 around a foot.

In some embodiments, sole structure 200 includes at least an outsole 230 that may be the primary ground-contacting surface. In some embodiments, sole structure 200 may also have an inner sole or a midsole, or may have both an inner sole and a midsole. In some embodiments, outsole 230 may bear a tread pattern, or may have cleats, spikes or other ground-engaging protuberances.

In the embodiment shown in FIG. 1, sole structure 200 has an outsole 230 that includes a plurality of apertures 231 (also referred to simply as apertures 231). In some embodiments, plurality of apertures 231 could include polygonal apertures. In other embodiments, however, each aperture could have any other geometry, including geometries with non-linear edges that connect adjacent vertices. In the embodiment shown in FIG. 1, apertures 231 appear as three-pointed stars (also referred to herein as triangular stars or as tri-stars), surrounded by plurality of sole elements 232 (also referred to simply as sole elements 232). In this exemplary embodiment, sole elements 232 are triangular. In other embodiments, the apertures may have other geometries and may be surrounded by sole elements having other geometries. For example, the sole elements may be geometric features. The triangular features 232 shown in FIG. 1 are one example of such geometric features. Other examples of geometric features that might be used as sole elements are quadrilateral features, trapezoidal features, pentagonal features, hexagonal features, octagonal features, oval features and circular features. In the embodiment shown in FIG. 1, the joints at the vertices 233 function as hinges, allowing the triangular sole elements 232 to rotate as the sole is placed under tension. When a portion of the sole is under tension, this action allows the portion of the sole under tension to expand both in the direction under tension and in the direction in the plane of the sole that is orthogonal to the direction under tension.

Structures that expand in a direction orthogonal to the direction under tension, as well as in the direction under tension, are known as auxetic structures. FIG. 2 shows schematically how the geometries of apertures 231 and their surrounding sole elements 232 result in the auxetic behavior of a portion of auxetic material 250 that forms outsole 230. FIG. 2 illustrates the bi-directional expansion of a portion of an auxetic material 250 when it is under tension in one direction. The drawing at the top of FIG. 2 shows a portion of an auxetic material 250 that has a width W1 and a length L1 in its initial unstressed state. In its unstressed state, the portion of auxetic material 250 has apertures 231 surrounded by sole elements 232. Each pair of sole elements 232 are joined at their vertices 233, leaving openings 234. In the embodiment shown in FIG. 2, the apertures 231 are triangular star-shaped apertures, the sole elements are triangular features, and openings 234 are the points of triangular star-shaped apertures 231. As best shown in the blow-up above the top drawing, in this embodiment, openings 234 may be characterized as having a relatively small acute angle when the portion of auxetic material 250 is not under tension.

FIG. 2 is a comparison of a portion of an embodiment of an auxetic material 250 in its initial unstressed state (shown in the top drawing) to a portion of that embodiment of an auxetic material 250 when it is under tension in a lengthwise direction (as shown in the bottom drawing). In FIG. 2, the application of tension in the direction shown by the arrows in the bottom drawing to auxetic material 250 rotates adjacent sole elements 232, which increases the relative spacing between adjacent sole elements 232. For example, as clearly seen in FIG. 2, the relative spacing between adjoining sole elements 232 (and thus the size of apertures 231) increases with the application of tension. Because the increase in relative spacing occurs in all directions (due to the geometry of the original geometric pattern of apertures), this results in an expansion of the auxetic material along both the direction under tension, and along the direction orthogonal to the direction under tension. For example, in the exemplary embodiment shown in FIG. 2, in the initial or non-tensioned configuration (seen in the top drawing in FIG. 2), of the auxetic material portion 250 has an initial size L1 along one direction (e.g., the longitudinal direction) and an initial size W1 along a second direction that is orthogonal to the first direction (e.g., the lateral direction). In the expanded configuration (seen in the bottom drawing in FIG. 2), the auxetic material portion 250 has an increased size L2 in the direction under tension and an increased size W2 in the direction that is orthogonal to the direction under tension. Thus, it is clear that the expansion of auxetic material 250 is not limited to expansion in the direction under tension.

In the embodiment of FIG. 1, the sole structure has an auxetic layer that functions as an outsole because it is the ground-contacting component of the sole structure. In other embodiments, described below with reference to FIGS. 11-15, the auxetic layer in the sole structure functions as a midsole, rather than as an outsole, i.e., the auxetic layer is not the ground-contacting component of the sole structure. Instead, the auxetic layer is the midsole in the sole structure that provides cushioning and absorbs impact forces when the article of footwear strikes the ground.

In the exemplary embodiments shown in the figures, an auxetic structure, including an outsole or a midsole that includes an auxetic layer, may be tensioned in the longitudinal direction or in the lateral direction. However, the configuration discussed in this application for auxetic structures comprised of geometric apertures surrounded by geometric portions provides a structure that can expand along any first direction along which tension is applied, as well as along a second direction that is orthogonal to the first direction. Moreover, it should be understood that the directions of expansion, namely the first direction and the second direction, may generally be tangential to a surface of the auxetic structure. In particular, the auxetic structures discussed here may generally not expand substantially in a vertical direction that is associated with a thickness of the auxetic structure.

Figure 3:
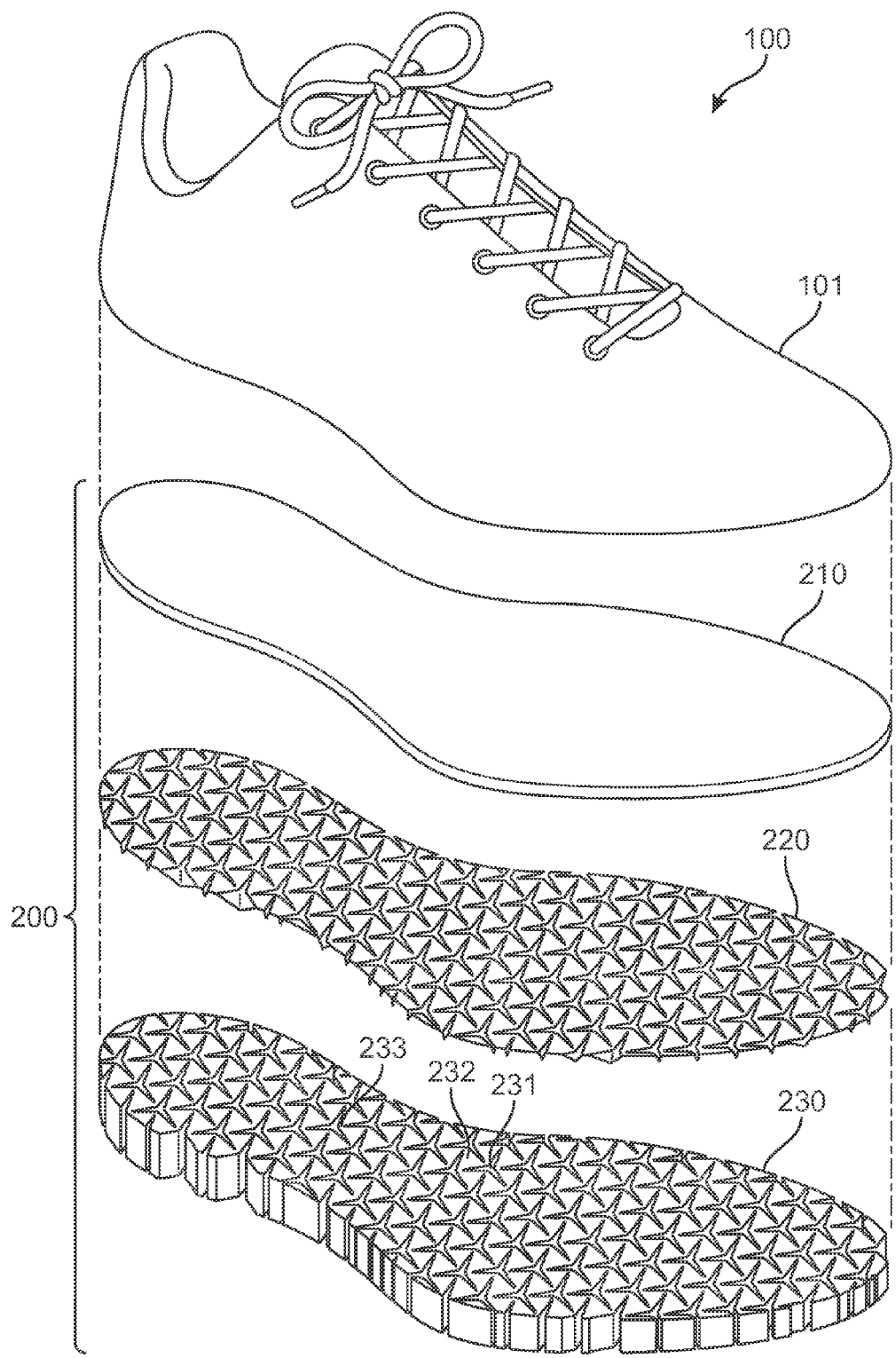
FIG. 3 is an exploded view of the article of footwear of FIG. 1.

Although the apertures 231 are shown in FIGS. 1-3 as having the shape of a three-pointed star, in general, each aperture in plurality of apertures 231 may have any kind of geometry. In some embodiments, an aperture may have a polygonal geometry, including a convex and/or concave polygonal geometry. In many cases, the geometry of the aperture may be characterized as a polygon with inwardly-pointing sides. For example, in the embodiment shown in FIGS. 1-3, the geometry of apertures 231 can be characterized as a triangle with sides that, instead of being straight, have an inwardly-pointing vertex at the midpoint of the side. The angles formed by these inwardly-pointing vertices are termed "reentrant" angles. The reentrant angle formed at these inwardly-pointing vertices may range from 179° (when the side is almost straight) to, for example, 120° or less.

Other geometries are also possible, including a variety of polygonal and/or curved geometries. Exemplary polygonal shapes that may be used with one or more of apertures 231 include, but are not limited to: regular polygonal shapes (e.g., triangular, rectangular, pentagonal, hexagonal, etc.) as well as irregular polygonal shapes or non-polygonal shapes. Other geometries could be described as being quadrilateral, pentagonal, hexagonal, heptagonal, and octagonal or other polygonal shapes with reentrant sides, or may even have inwardly curving sides. As noted above, the sole elements defining the apertures may be geometric features such as triangular features, quadrilateral features, trapezoidal features, hexagonal features, octagonal features, oval features and circular features.

Although the embodiments shown in the figures are shown as having apertures with approximately polygonal geometries, including approximately point-like vertices at which adjoining sides or edges connect, in other embodiments some or all of an aperture could be non-polygonal. In particular, in some cases, the outer edges or sides of some or all of an aperture may not be joined at vertices, but may be continuously curved. For example, the apertures may have three vertices with three inwardly curved sides joining the three vertices. Moreover, some embodiments can include apertures having a geometry that includes both straight edges connected via vertices as well as curved or non-linear edges without any points or vertices.

FIG. 3 is an exploded perspective view of an example of the embodiment of the article of footwear shown in FIG. 1. This figure shows each of the major components of an article of footwear 100 including an upper 101 and a sole structure 200. In this embodiment, sole structure 200 has three major components: an insole 210, an auxetic liner 220 and an auxetic outsole 230. In this embodiment, auxetic liner 220 is positioned above auxetic outsole 230. In particular, auxetic liner 220 is positioned between auxetic outsole 230 and upper 101 (or likewise between auxetic outsole 230 and insole 210). Thus, it will be understood that auxetic liner 220 is positioned inwardly of auxetic outsole 230, with the inward direction being directed inwardly towards an interior cavity of article of footwear 100.

Figure 4:
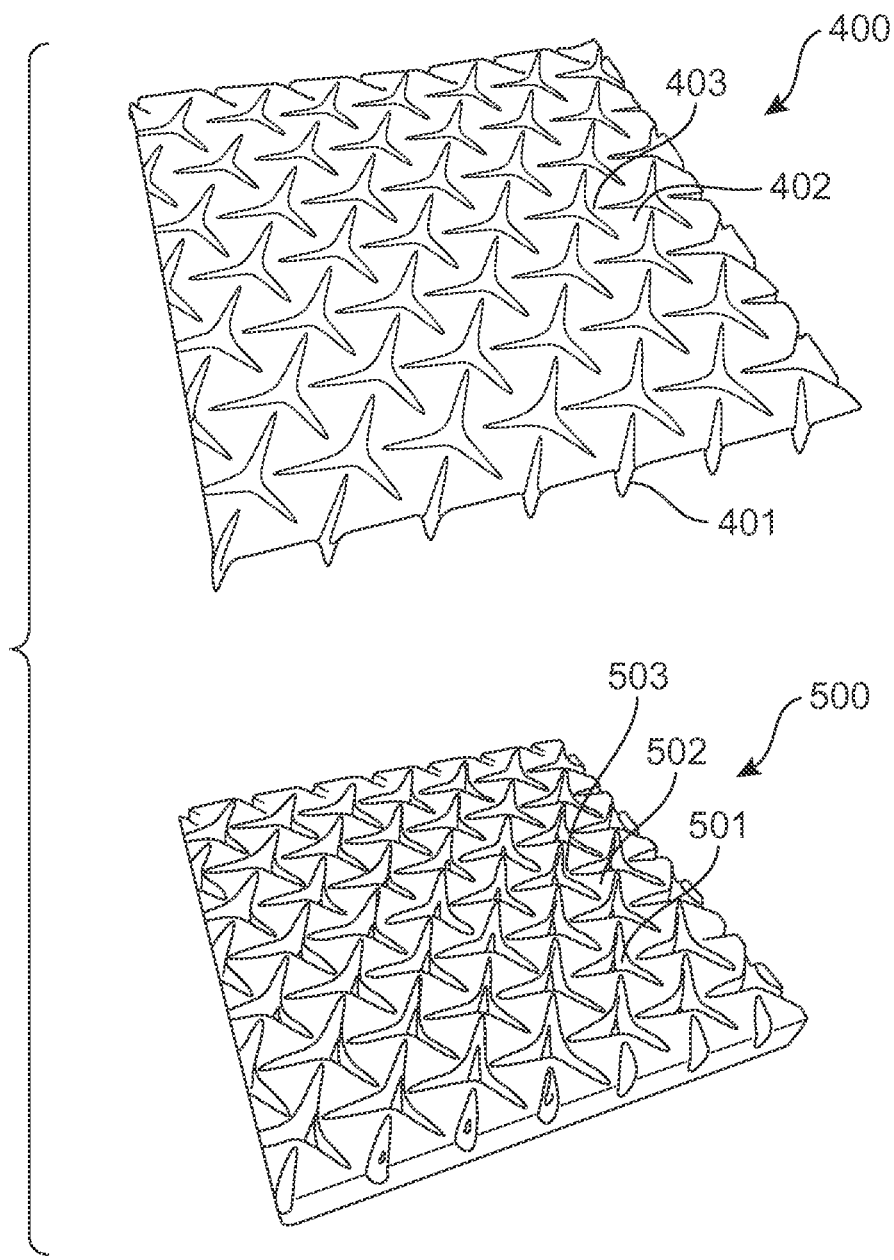
FIG. 4 is a schematic diagram of an embodiment of an auxetic liner and an auxetic outsole.
Figure 5:
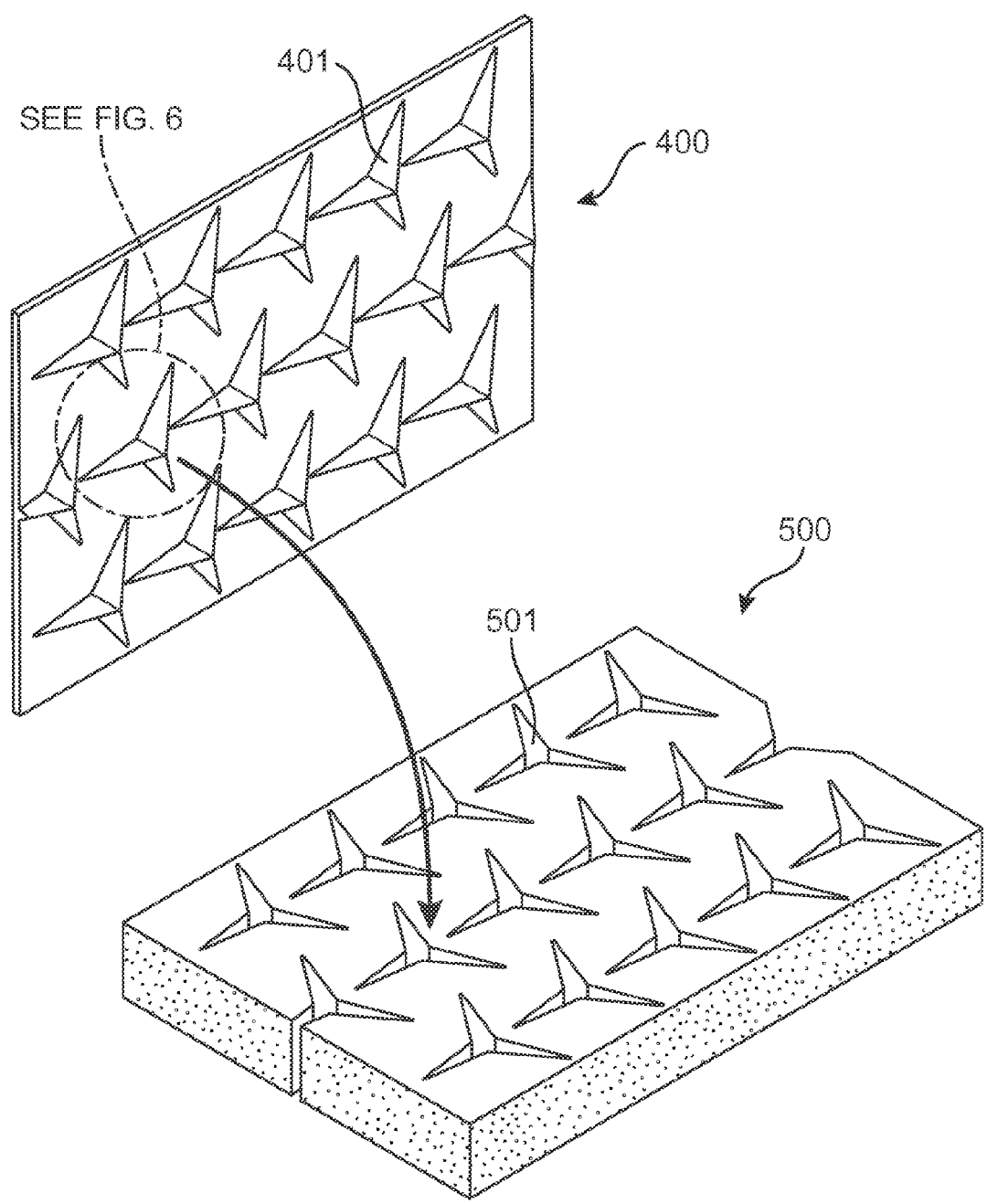
FIG. 5 is a schematic diagram of an embodiment showing how an auxetic liner fits into an auxetic outsole.

FIG. 4 and FIG. 5 show how an auxetic liner 400 mates with and fits into auxetic outsole 500. As shown in FIG. 4, a section of auxetic liner 400 has downwardly pointing projections 401 that are dimensioned and positioned to fit into apertures 501 in a corresponding section of auxetic outsole 500. Projections 401 are shaped to fit closely into apertures 501. In some embodiments, auxetic liner 400 is made of a thin, flexible, resilient and stretchable material that can stretch, flex and bend as outsole 500 flexes and bends. Projections 401 may be hollow, such that they can readily close or open up as the auxetic liner bends and flexes. In this embodiment, auxetic liner 400 has an auxetic structure formed of sole elements 402 that are joined at their vertices 403, which match the corresponding sole elements 502 and vertices 503 in auxetic outsole 500. Vertices 403 and vertices 503 function as hinges, allowing adjoining sole elements 402 in auxetic liner 400 and sole elements 502 in auxetic outsole 500 to rotate with respect to each other, and thus allow some expansion of the material in a direction that is orthogonal to the direction under tension. In this embodiment, projections 401 have a substantially three-pointed star cross-sectional shape over their entire height, culminating in an apex 416 (identified in FIG. 6, discussed below).

Figure 6:
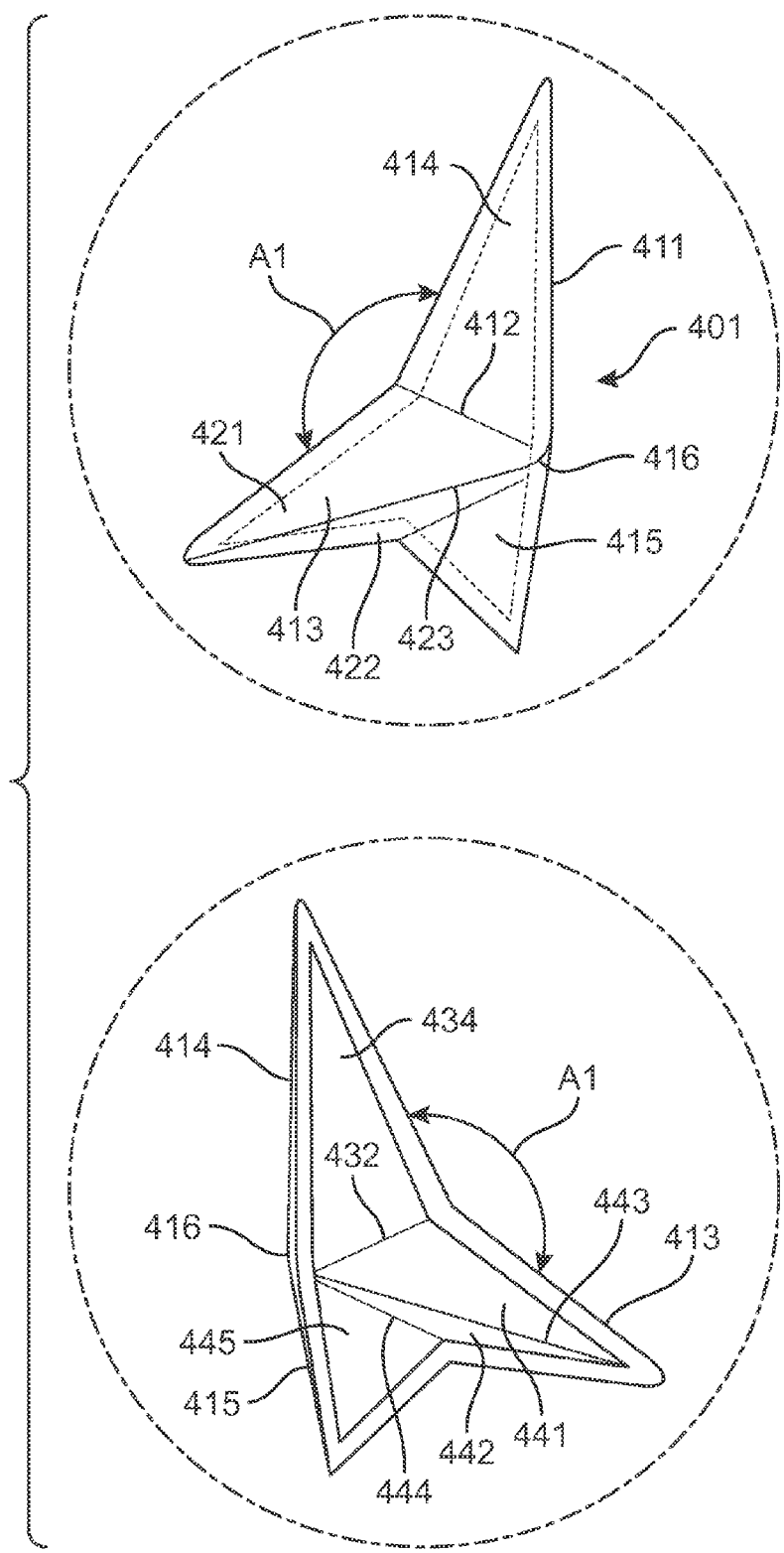
FIG. 6 is a schematic diagram of a projection of an auxetic liner.

FIG. 5 is a schematic diagram showing how a hollow projection 401 of the section of an auxetic liner 400 (shown in FIG. 4) fits into a corresponding aperture 501 in a section of the auxetic outsole 500 (also shown in FIG. 4). Auxetic liner 400 may be formed from a sheet of an elastic and resilient material, for example, by molding, embossing or other means. FIG. 6 show two views of a single hollow projection 401. The top diagram is a view of the exterior of hollow projection 401, and the bottom diagram is a view of the interior of hollow projection 401.

As shown in the top diagram of FIG. 6, in this embodiment projection 401 has a substantially three-pointed star cross-sectional shape in a substantially horizontal plane over the entire height of projection 401. Projection 401 can also be characterized as having three pyramidal sections (section 413, section 414 and section 415 as shown in FIG. 6) that are joined along edges (e.g., exterior edge 412 between section 413 and section 414). The top peak of all three pyramidal sections forms the apex 416 of projection 401. As seen in the top diagram of FIG. 6, each pyramidal section, or arm, of projection 401 is further comprised of two faces. For example, pyramidal section 413 is seen to have a first face 421 and a second face 422, which are joined along an upper edge 423.

The bottom diagram of FIG. 6 is an interior view of hollow projection 401, showing its three pyramidal section of arms (section 413, section 414 and section 415) which join at apex 416. This diagram shows that section 413 has a first interior surface 441 and a second interior surface 442 which meet at interior edge 443. First interior surface 441 and second interior surface 442 are the interior surfaces that correspond to first face 421 and second face 422 described above with respect to the top diagram. Interior surface 441 of section 413 joins interior surface 434 of pyramidal section 414 at interior edge 432. Interior surface 442 of section 413 joins interior surface 445 of section 415 at interior edge 444.

Because auxetic liner 400 may be molded from a sheet of an elastic and resilient material, the angle between any two adjacent pyramidal sections, such as the angle A1 identified in FIG. 6 between pyramidal section 413 and pyramidal section 414, may adjust so that auxetic liner 400 can conform readily to auxetic outsole 500, as auxetic outsole 500 responds to imposed stresses. In particular, the edges between adjacent sections (for example, edge 412) and the edges between adjacent faces in each section (for example, edge 423) may all operate as hinge-like portions such that geometry of projection 401 can change. For example, as tension is applied across projection 401 in a horizontal direction (for example, lateral or longitudinal), adjacent faces comprising projection 401 may move so that projection 401 decreases in height and expands horizontally both laterally and longitudinally.

Embodiments can use any of the auxetic structures, including pyramid-like structures, configurations and/or systems disclosed in Cross, U.S. patent application Ser. No. 14/565,143, filed Dec. 9, 2014, entitled "Footwear with Auxetic Ground Engaging Members," the entirety of which is herein incorporated by reference.

Figure 7:
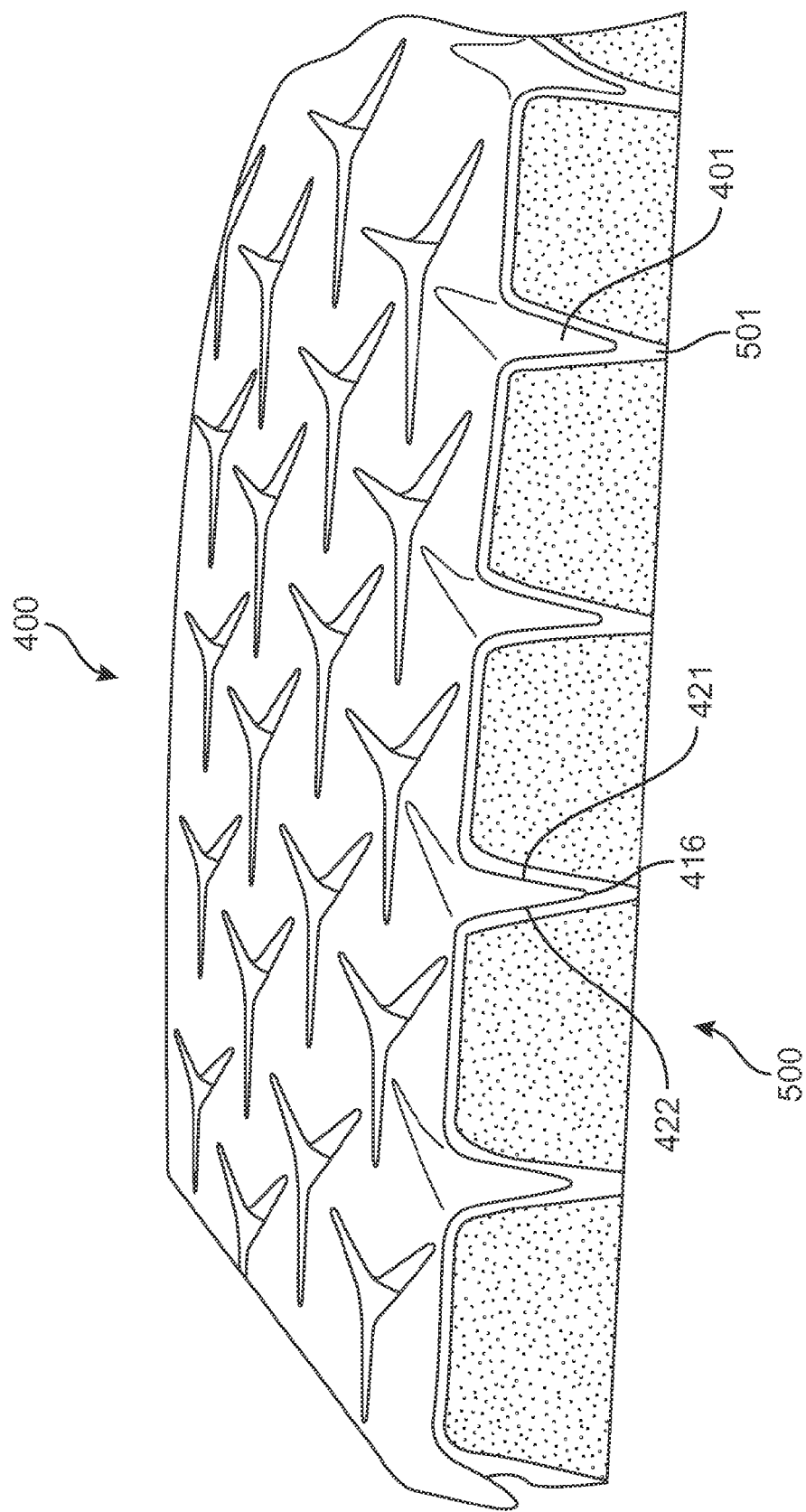
FIG. 7 is a schematic diagram showing a portion of an auxetic liner fitting into a corresponding portion of an auxetic outsole.

FIG. 7 is a side perspective view of a section of auxetic outsole 500 and a section of auxetic liner 400, showing how the projections 401 of auxetic liner 400 fit into apertures 501 in auxetic outsole 500. Apex 416 of a pyramidal downwardly-pointing projection 401 has faces such as face 421 and face 422 that slide into apertures 501 of auxetic outsole 500. In operation, the projections 401 of auxetic liner 400 fill up most if not all of apertures 501, such that water, dirt, pebbles or other debris cannot enter and remain in apertures 501. Because auxetic liner 400 is made from a sheet of a thin, flexible and elastic material and because its auxetic structure matches the auxetic structure of auxetic outsole 500, it can readily stretch and bend to accommodate the expansion of outsole structure 501 when it is under longitudinal or lateral tension, or bend along with outsole 500. Thus auxetic liner 400 both protects auxetic outsole 500 and complements the performance of auxetic outsole 500.

In some embodiments, projections 401 may protrude through apertures 501. The projections could then engage a playing surface such as a grass field, a track or a running trail, and thus provide additional traction for outsole 500. In these embodiments, projections 401 could be made of or coated with a relatively tough, abrasion-resistant material, such as PEEK (polyether ether ketone) or other abrasion resistant polymer.

Figure 8:
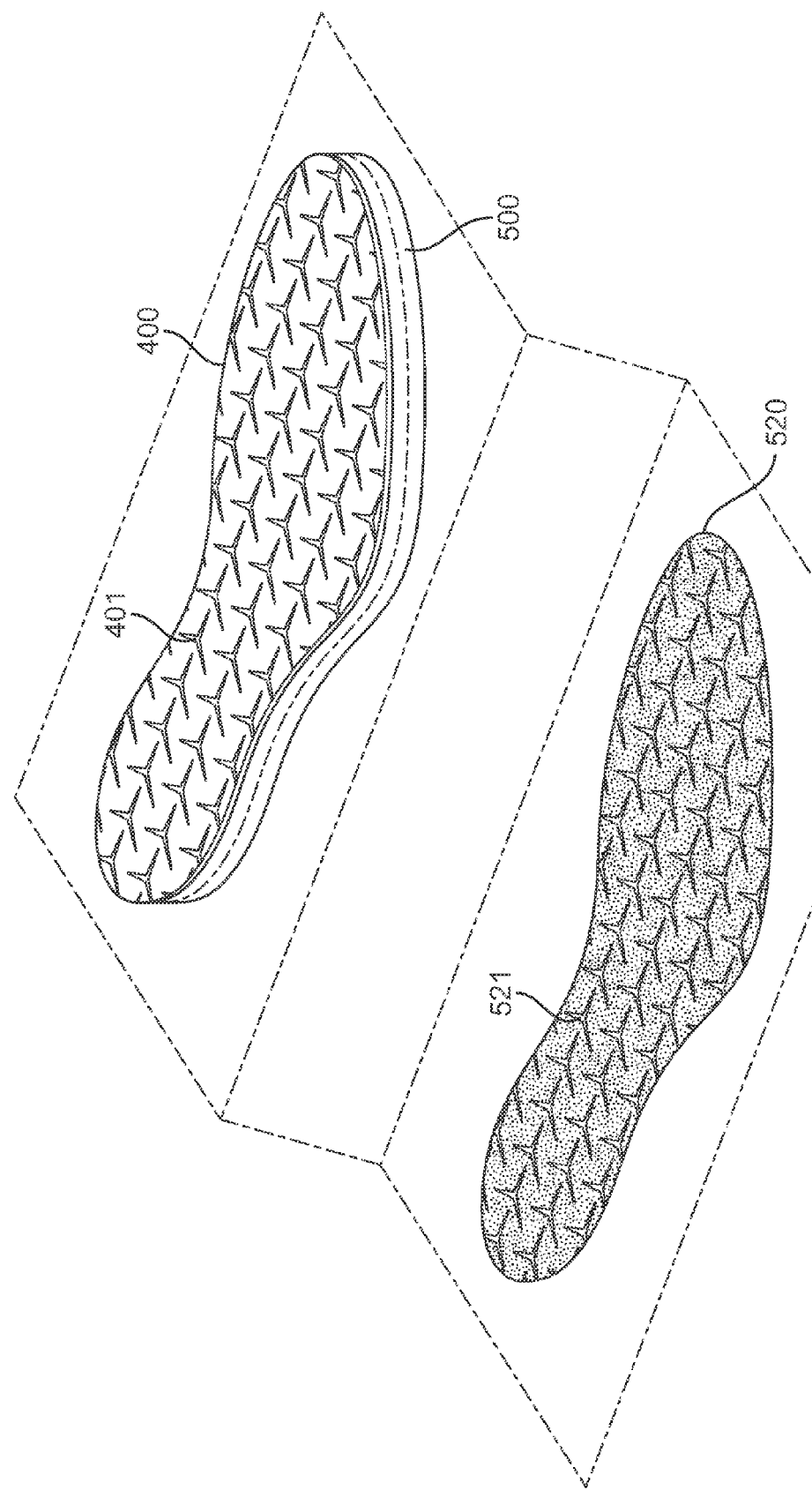
FIG. 8 is a schematic diagram of an embodiment of an auxetic sole structure, showing the auxetic liner and a cross-section of an auxetic outsole when the outsole is not under tension.
Figure 9:
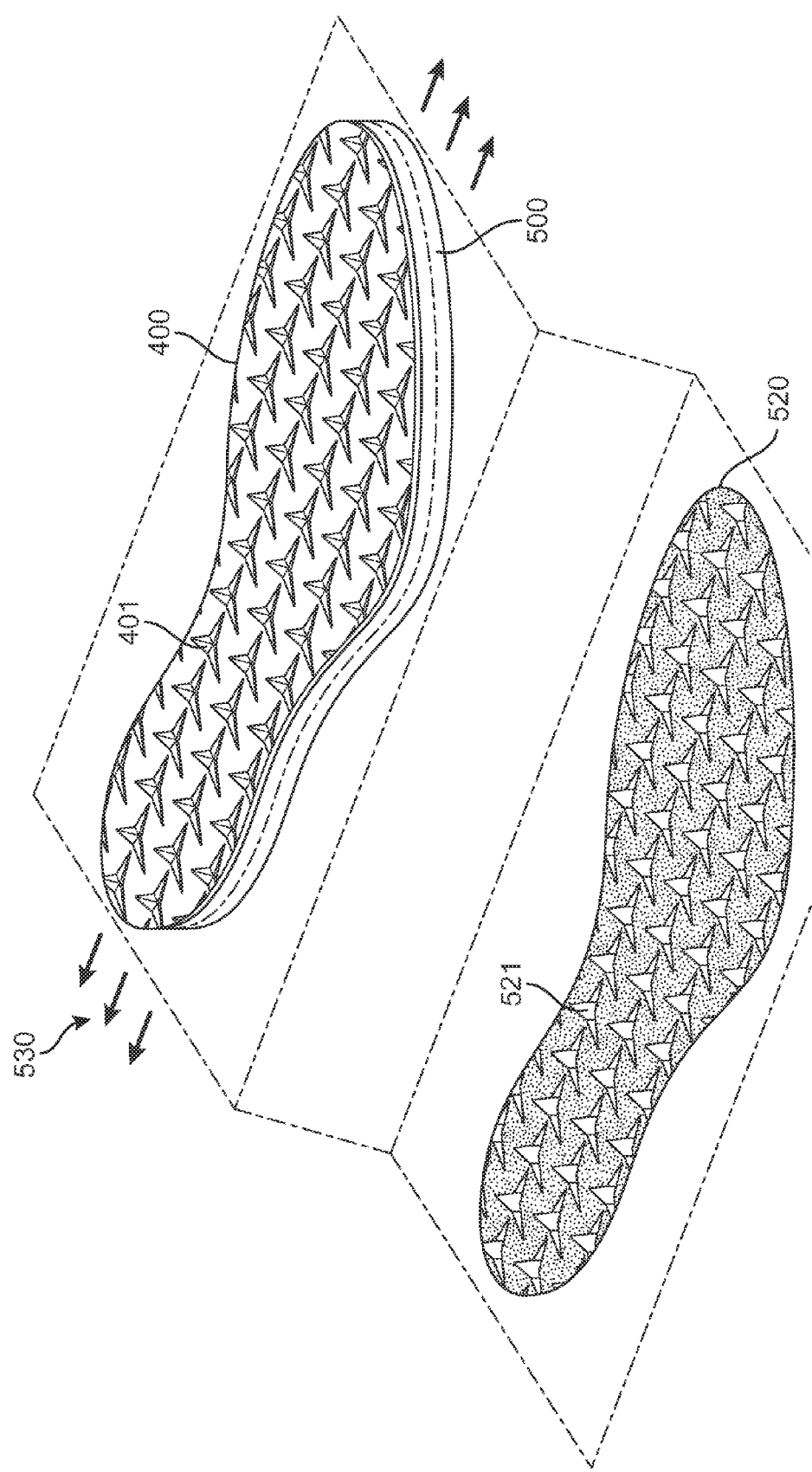
FIG. 9 is a schematic diagram of an embodiment of an auxetic sole structure, showing the auxetic liner and a cross-section of an auxetic outsole when the outsole is under longitudinal tension.

FIG. 8 is a schematic diagram showing an auxetic liner 400 with its projections 401 in an auxetic outsole 500. In this figure, auxetic liner 400 and auxetic outsole 500 are not under stress. FIG. 8 also shows a cross-section 520 of auxetic outsole 500, taken as indicated in FIG. 8, with apertures 521 in their unstressed geometry. FIG. 9 shows how the geometry of auxetic liner 400 and auxetic outsole 500 changes when the sole structure is under longitudinal tension, as indicated by the arrows 530. Because the sole structure is under longitudinal tension, the pyramidal sections in auxetic liner 400 and the corresponding sections of apertures 501 adjust cooperatively, increasing the dimensions of the apertures and the projections, as shown in FIG. 9. Specifically, as auxetic outsole 500 expands both longitudinally and laterally in response to a longitudinal tension, auxetic liner 400 expands in a similar manner so that the expansion of auxetic liner 400 is compatible with the expansion of auxetic outsole 500, such that auxetic liner 400 may provide full coverage of auxetic outsole 500.

Figure 10:
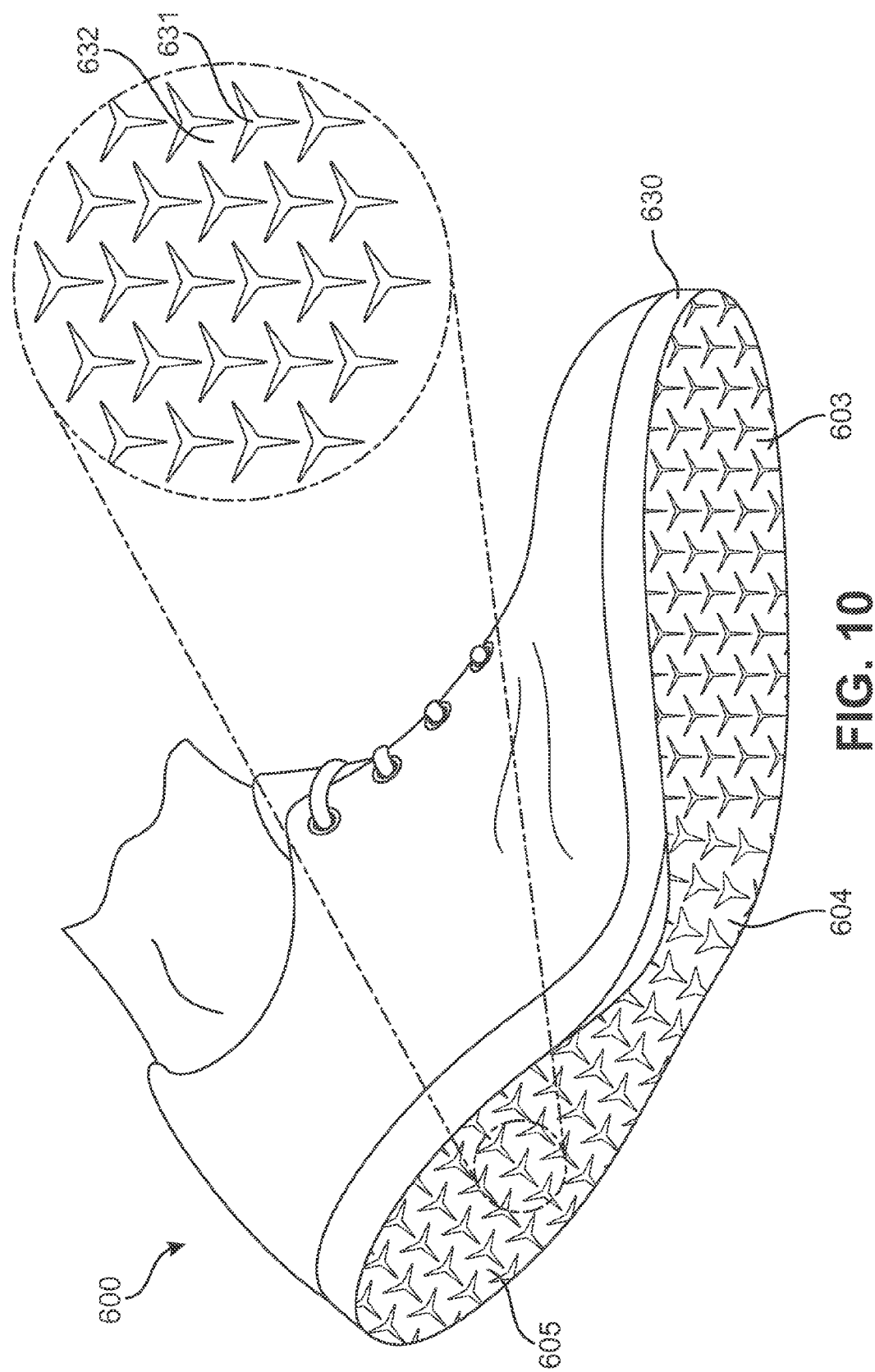
FIG. 10 is a schematic diagram of an article of footwear illustrating the geometry of an auxetic structure in the heel region of the outsole during a foot strike.
Figure 11:
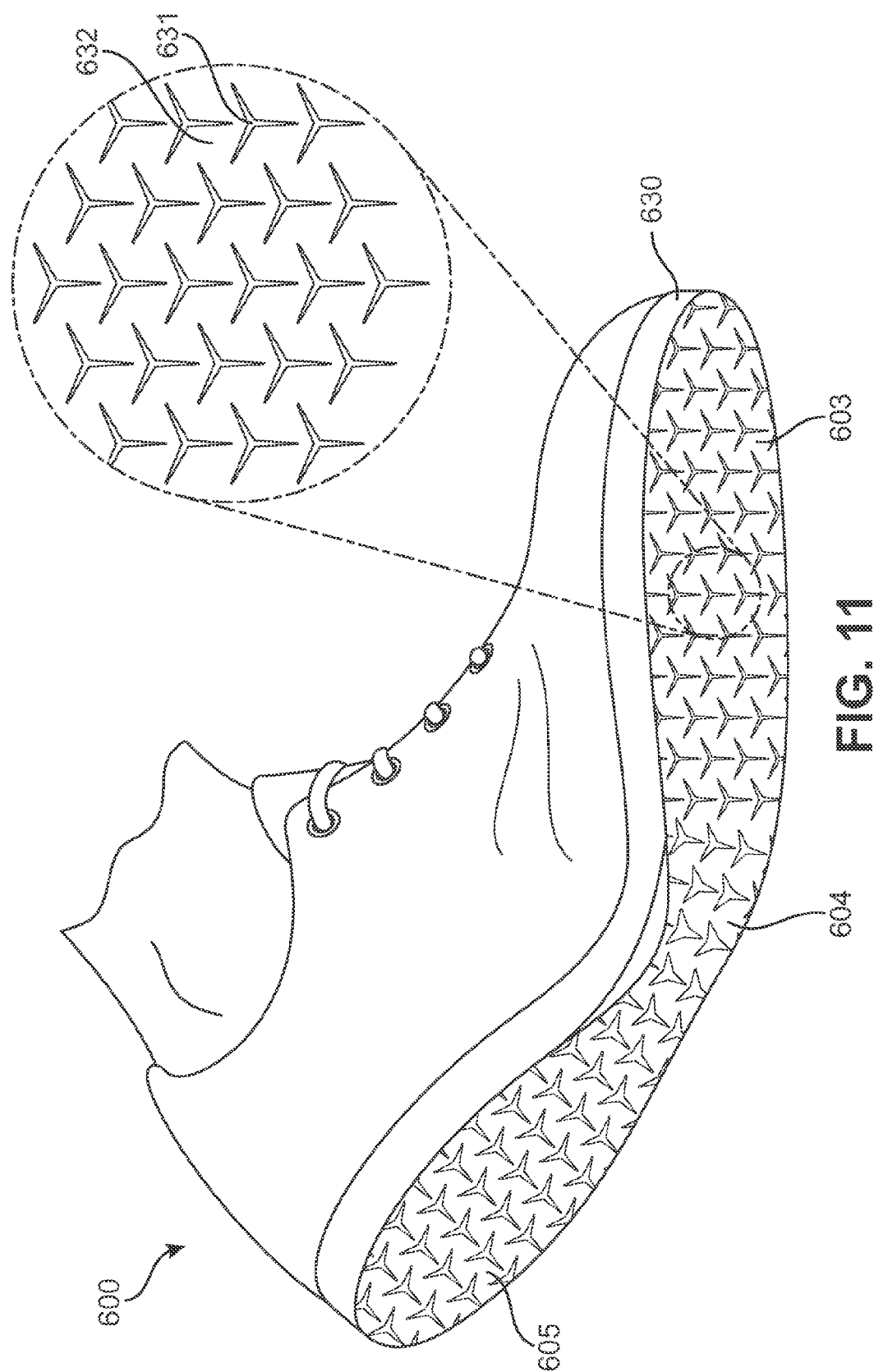
FIG. 11 is a schematic diagram of an article of footwear illustrating the response of the auxetic structure in the forefoot region of the outsole during a foot strike.
Figure 12:
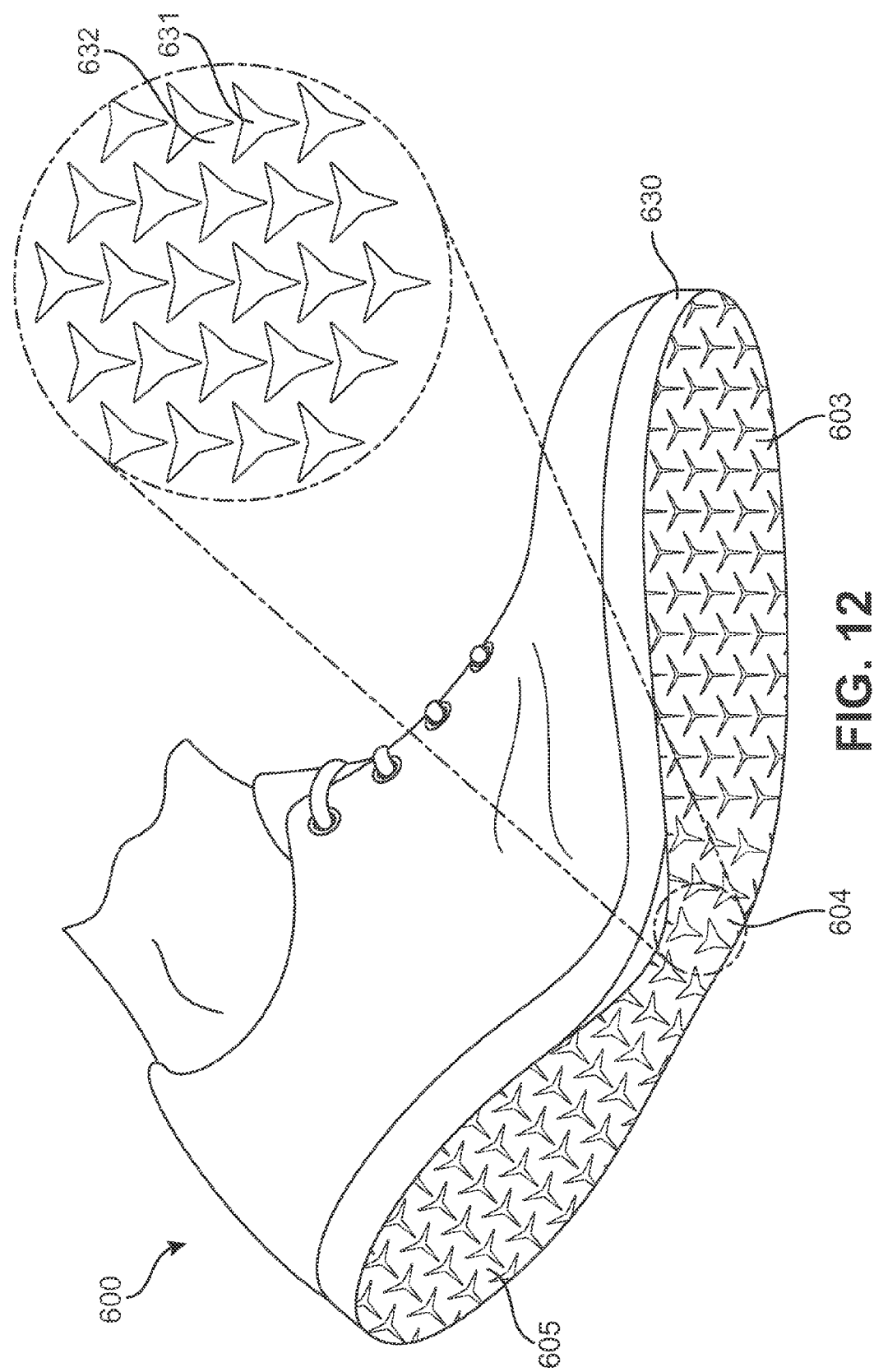
FIG. 12 is a schematic diagram of an article of footwear illustrating the response of the auxetic structure in the midfoot region of the outsole strike.

FIG. 10, FIG. 11 and FIG. 12 show how different regions of an auxetic outsole 630 respond to the stresses imposed on the auxetic outsole when, for example, a person wearing the article of footwear is running. In these figures, article of footwear 600 is shown as the runner is pressing down on his forefoot and lifting his heel up in the air. At this point in the runner's stride, the portion of the outsole in the heel region 605 of the auxetic outsole is not under either tension or compression, the forefoot region 603 is under vertical compression, and midfoot region 604 is under longitudinal tension. Because heel region 605 is not under tension or compression, the apertures 631 and sole elements 632 in the heel region are in their initial relaxed state, which is shown in the blow-up in FIG. 10.

Because auxetic structures made of resilient materials may contract under vertical impact, in the embodiment shown in FIGS. 10-12, when forefoot region 603 is under vertical compression, sole elements 632 around apertures 631 move in towards the centers of the apertures, thus closing down apertures 631 to some extent, as shown in the blow-up of FIG. 11. This action absorbs some of the impact force and increases the amount of material under the forefoot, thus cushioning the impact of the foot strike against the ground. Finally, because midfoot region 604 is under tension, sole elements 632 around apertures 631 in the auxetic outsole rotate, thus opening up apertures 631 as discussed above with reference to FIG. 4 and FIG. 5, and as shown in the blow-up of FIG. 12. This action allows the outsole to conform to the configuration of the runner's foot as it bends up at the heel and down at the forefoot.

Figure 13:
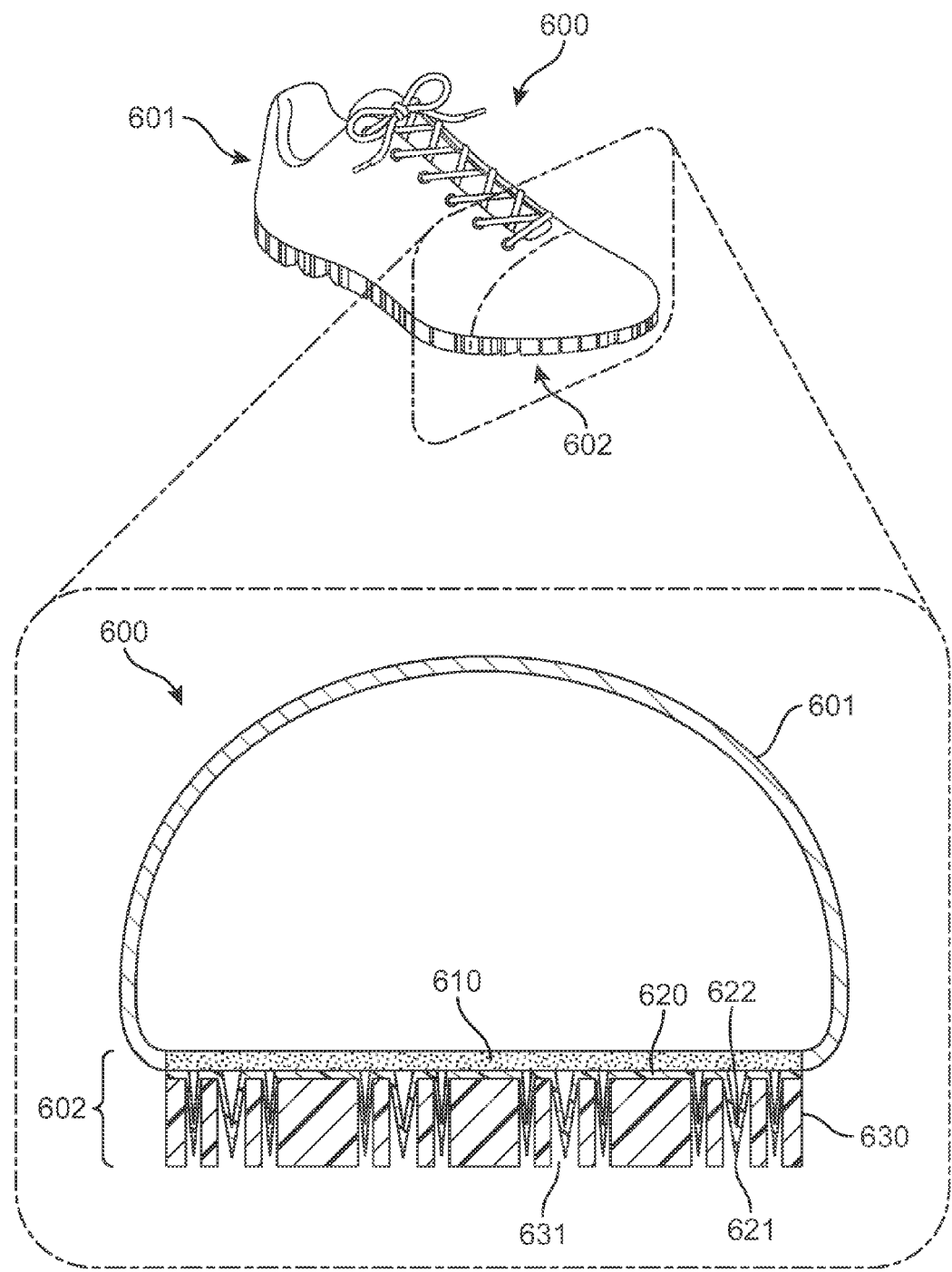
FIG. 13 is a schematic diagram showing a lateral cross-section of an embodiment of an article of footwear.
Figure 14:
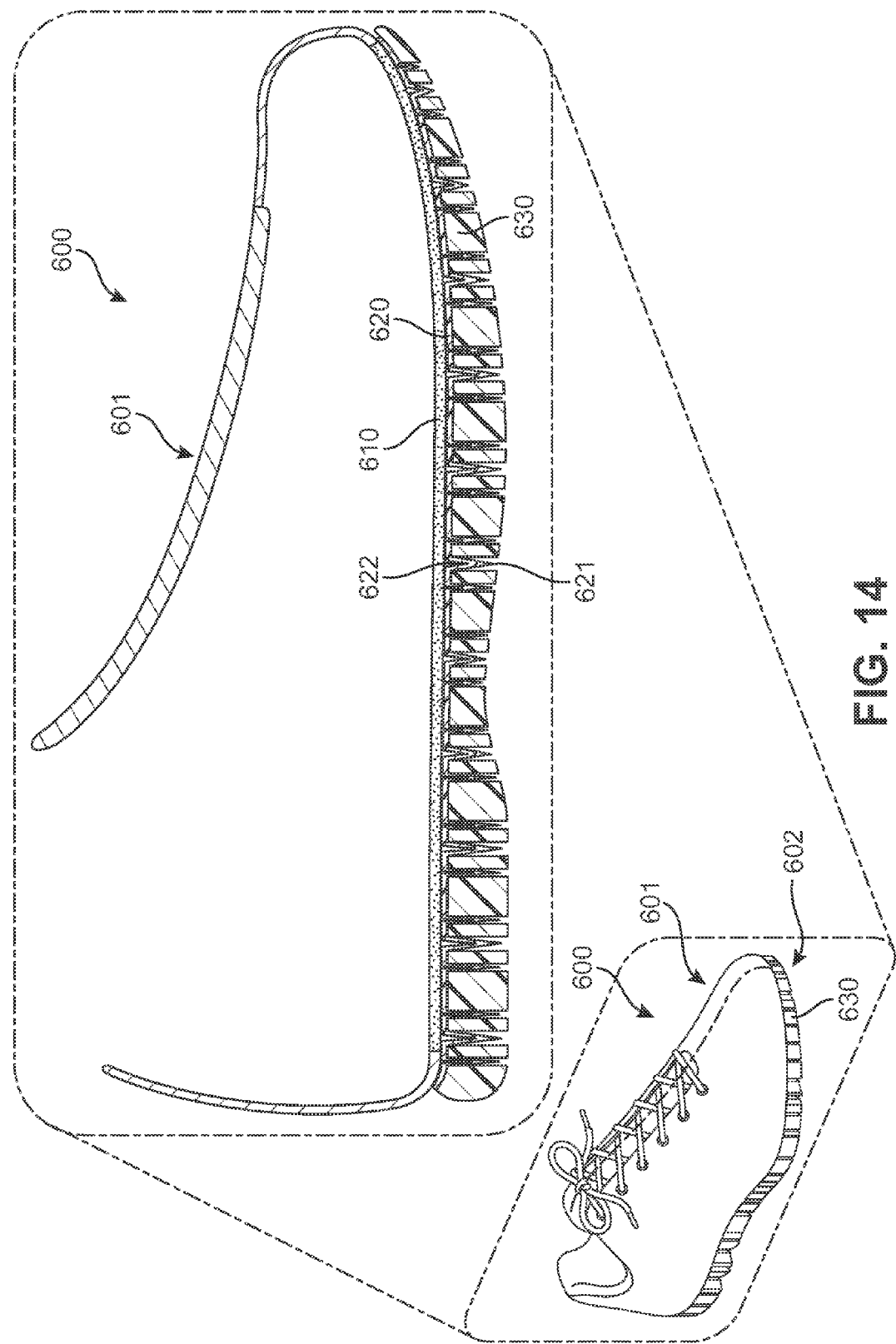
FIG. 14 is a schematic diagram showing a longitudinal cross-section of an embodiment of an article of footwear.
Figure 15:
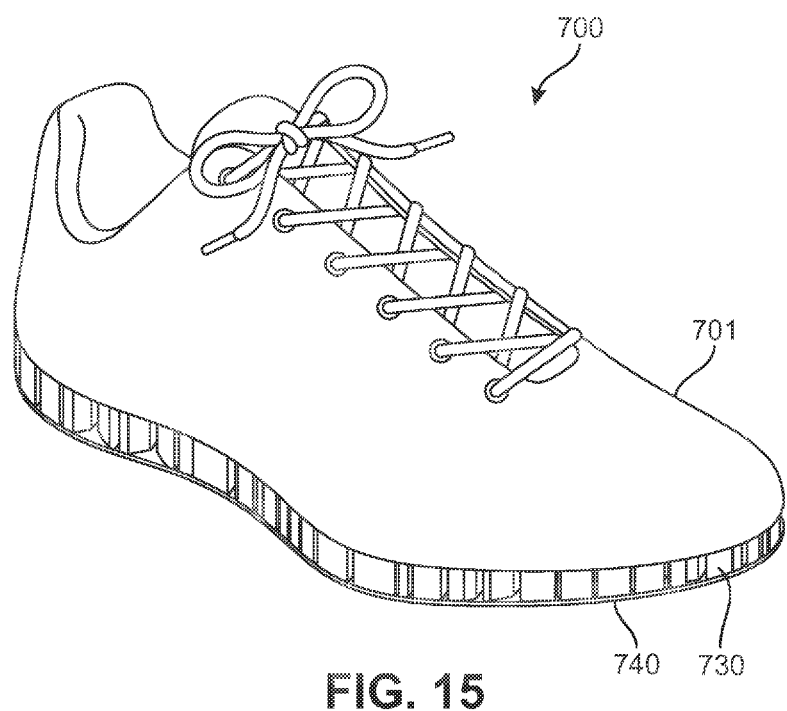
FIG. 15 is a schematic diagram illustrating another embodiment of an article of footwear.

FIG. 13 and FIG. 14 are schematic illustrations of the structure of the embodiment shown in FIG. 1, an embodiment in which the article of footwear has an auxetic liner positioned above its auxetic outsole. FIG. 13 is a perspective view of this embodiment with a cutaway view of a lateral cross-section of the article of footwear 600. FIG. 14 is similar to FIG. 13, but in this case the cutaway view is a view of a longitudinal cross section of article of footwear 600. As shown in FIG. 13 and FIG. 14, article of footwear 600 has an upper 601 for enclosing the wearer's foot attached to a sole structure 602. Sole structure 602 has an insole 610, an auxetic liner 620 and an auxetic outsole 630. Hollow projections 621 extend down from auxetic liner 620 into apertures 631. As shown in FIG. 13 and FIG. 14, in some embodiments projections 621 have a hollow interior 622. Projections 621 fill up much of the volume of apertures 631, thus preventing debris or moisture from entering apertures 631 and interfering with the operation of auxetic outsole 630. Moreover, because auxetic liner 620 has an auxetic structure that matches the auxetic structure of auxetic outsole 630, auxetic liner 620 complements the performance of auxetic outsole 630, rather than interfering with the performance of auxetic outsole 630.

Figure 16:
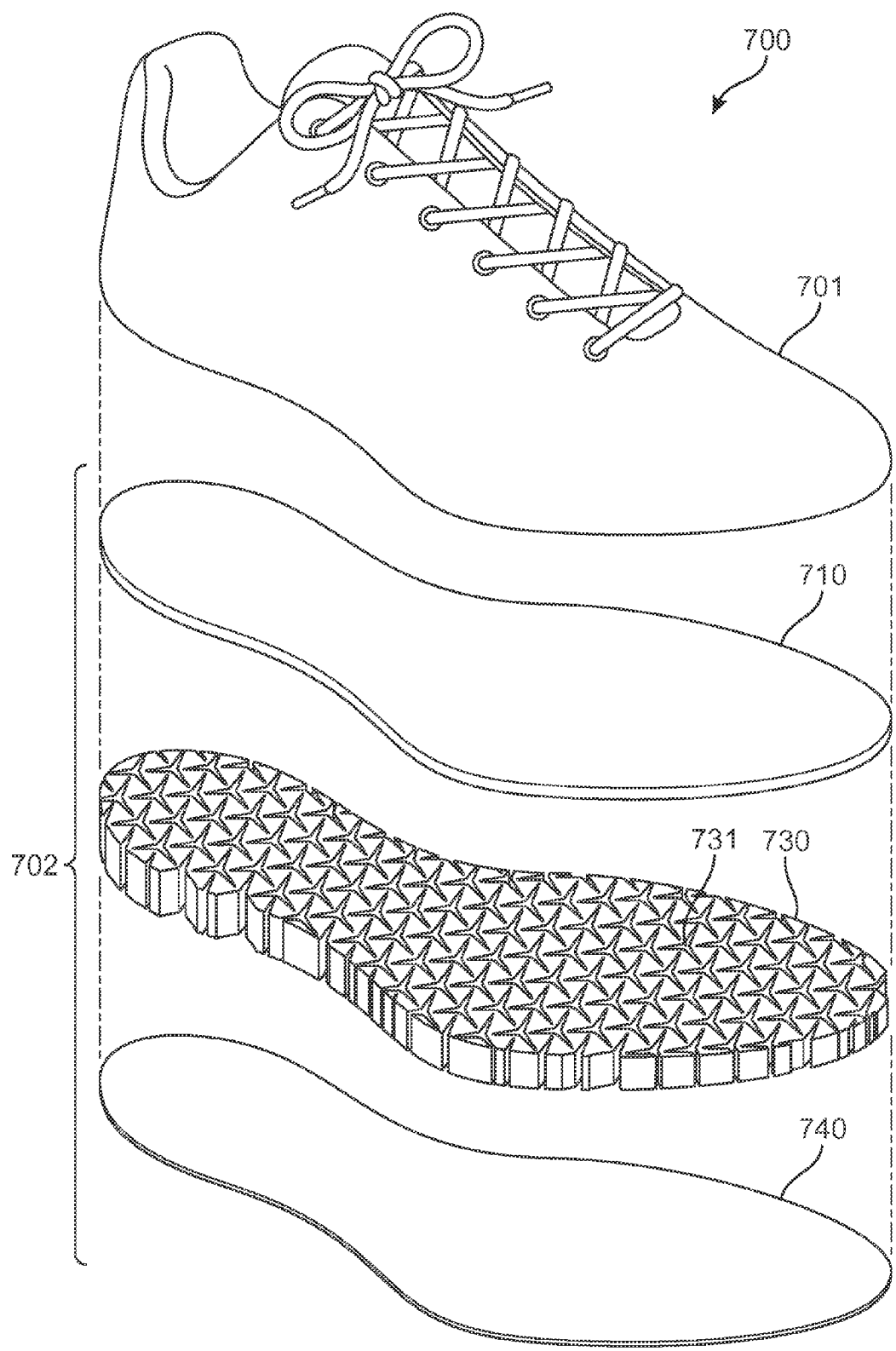
FIG. 16 is a schematic diagram showing an exploded view of the embodiment of FIG. 15.

In some embodiments, the liner may be a flat liner rather than a liner with an auxetic structure, as in the embodiment of FIGS. 1-14. In the embodiment shown in a perspective view in FIG. 15 and in an exploded view in FIG. 16, the article of footwear 700 has an upper 701 attached to a sole structure 702. In this embodiment, the auxetic layer 730 functions as a midsole. Sole structure 702 has a flat outsole liner 740 attached to the bottom of auxetic midsole 730, as well as an insole 710 positioned between the upper 701 and the auxetic midsole 730. Outsole liner 740 may be made of a resilient, elastic and flexible material such as an elastomeric polymer that accommodates and conforms to the shape of auxetic midsole 730 as auxetic midsole 730 bends and curves when the wearer of the footwear is running, leaping or cutting while engaging in an athletic or recreational activity. Also, because flat outsole liner 740 is the immediate ground-contacting surface in this embodiment, it could be made of a tough and abrasion-resistant material. Flat outsole liner 740 protects auxetic midsole 730 by preventing debris or moisture from entering into the apertures 731 in auxetic midsole 730.

Figure 17:
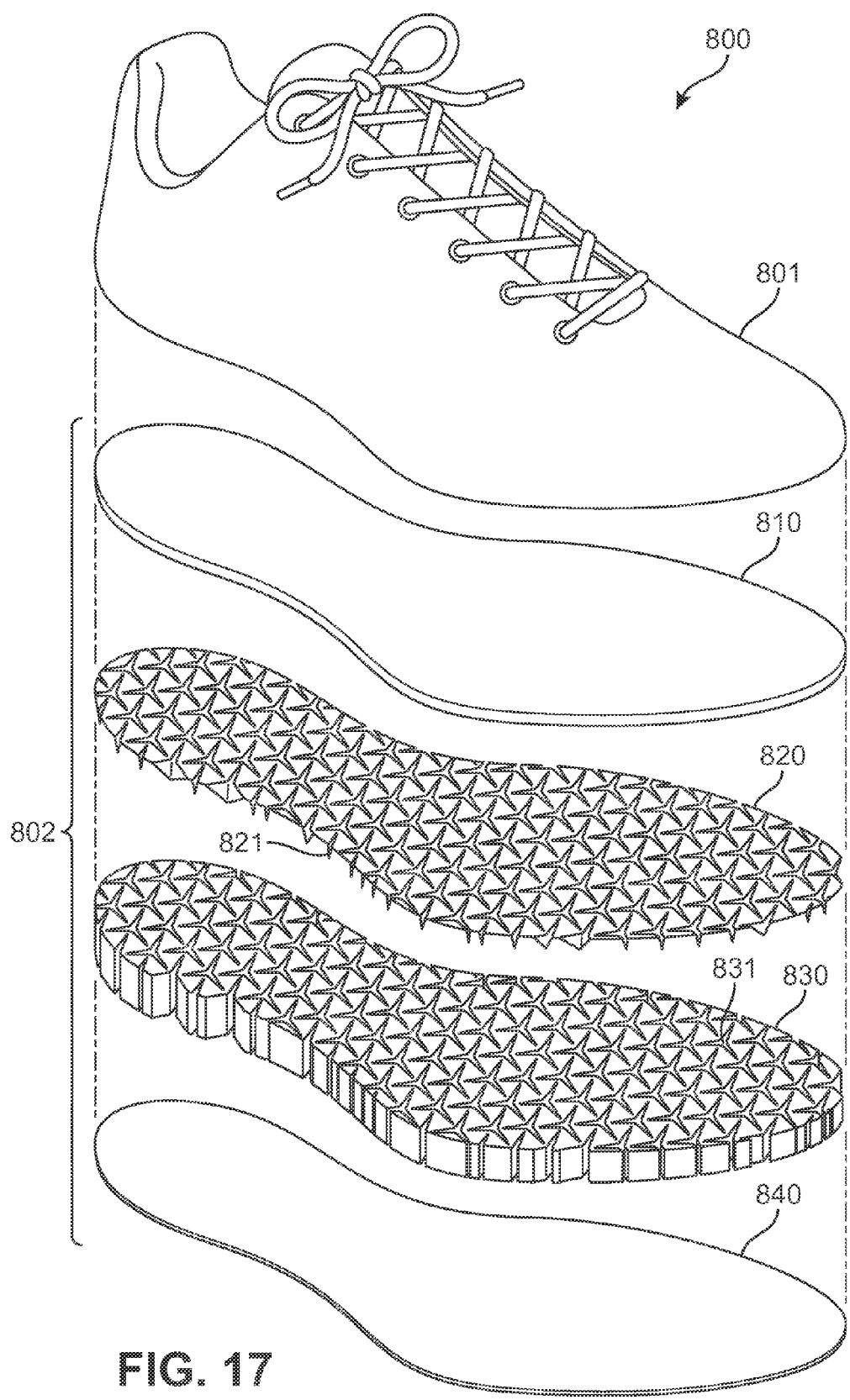
FIG. 17 is a schematic diagram showing an exploded view of another embodiment of an article of footwear.

In other embodiments, such as the example shown in exploded view in FIG. 17, the article of footwear 800 may include both an auxetic liner 820 positioned above (i.e., inwardly of) auxetic midsole 830 and a flat outsole liner 840 positioned below (i.e., outwardly of) auxetic midsole 830. In these embodiments, upper 801 is attached to sole structure 802, which includes an insole 810, an auxetic liner 820, an auxetic midsole 830 and an outsole liner 840. In this embodiment, auxetic liner 820 has tri-star shaped projections 821 that mate with similarly-shaped apertures 831 in auxetic midsole 830. Auxetic liner 820 may be made of a flexible and resilient material such that it may conform to the changing shape of auxetic midsole 830, as the wearer is engaging in various athletic or recreational activities. In these embodiments, outsole liner 840 prevents entry of debris into apertures 831 of auxetic midsole 830. The two auxetic components—the auxetic liner and the auxetic midsole—may have different material characteristics, so that the choice of materials in the combined structure can be used to tailor the characteristics of the article of footwear to match the requirements of a specific athletic or recreational activity. Also, the auxetic liner 820 may also have the function of preventing moisture that might diffuse through insole 810 from entering into apertures 831 in auxetic midsole 830.

Figure 18:
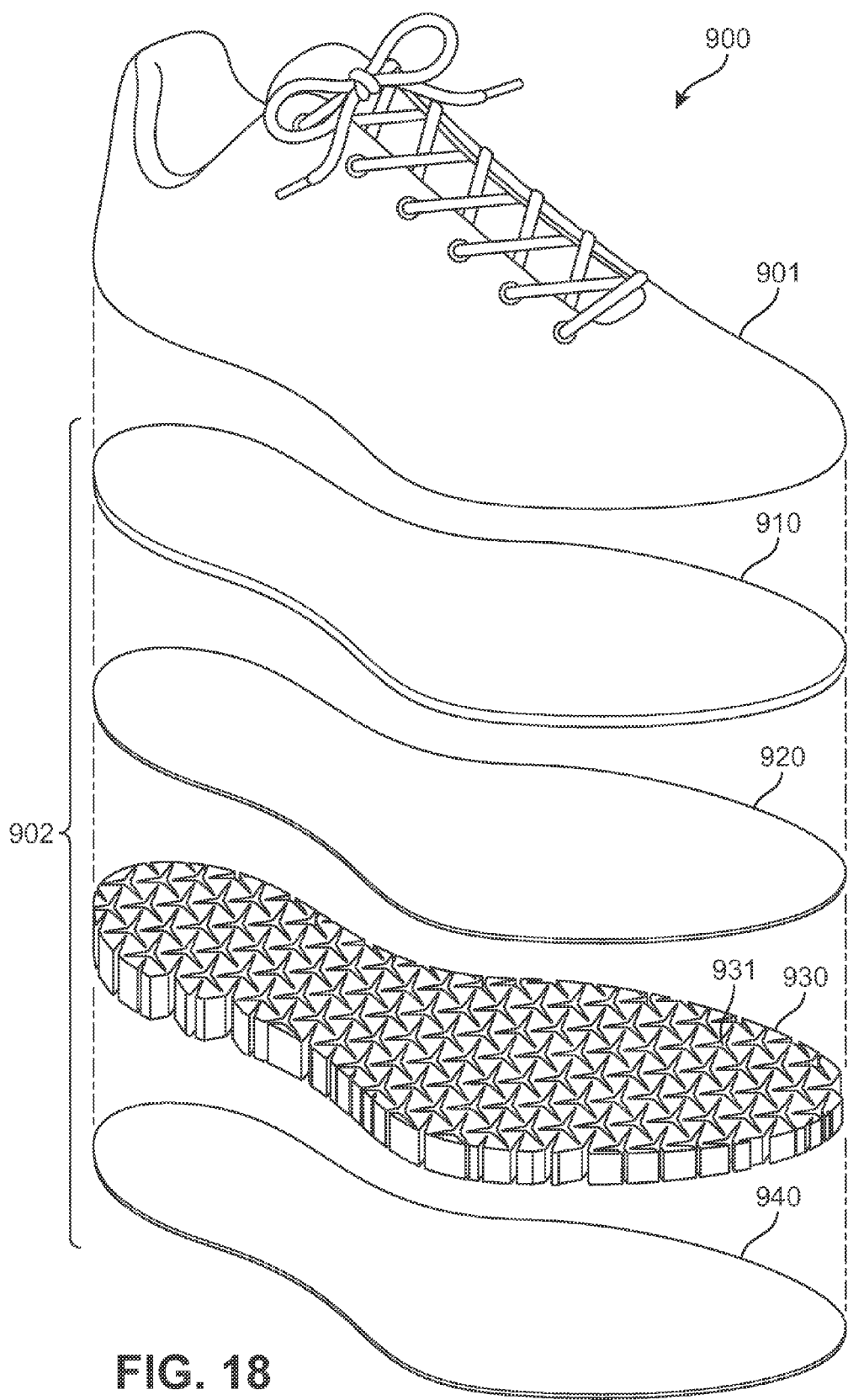
FIG. 18 is a schematic diagram showing an exploded view of another embodiment of an article of footwear.

In other embodiments, such as in the example shown in an exploded view in FIG. 18, the article of footwear 900 has an upper 901 attached to a sole structure 902. Sole structure 902 may have a flat insole liner 920 positioned between an insole 910 and the auxetic midsole 930 (i.e., inwardly of midsole 930), as well as a flat outsole liner 940 positioned below (i.e., outwardly of midsole 930) and attached to auxetic midsole 930. The insole liner may function as a "tie layer" that adheres well to both the insole 910 of the article of footwear and to the auxetic midsole 930 to promote the integrity of the sole structure 902. It may also function as a barrier preventing moisture that might diffuse through insole 910 from entering the apertures 931 in auxetic midsole 930. Flat outsole liner 940 prevents debris and moisture from entering into the apertures 931 in auxetic midsole 930. Flat outsole liner may be made of an abrasion-resistant elastomer, since it is the ground-engaging component of the sole structure.

Figure 19:
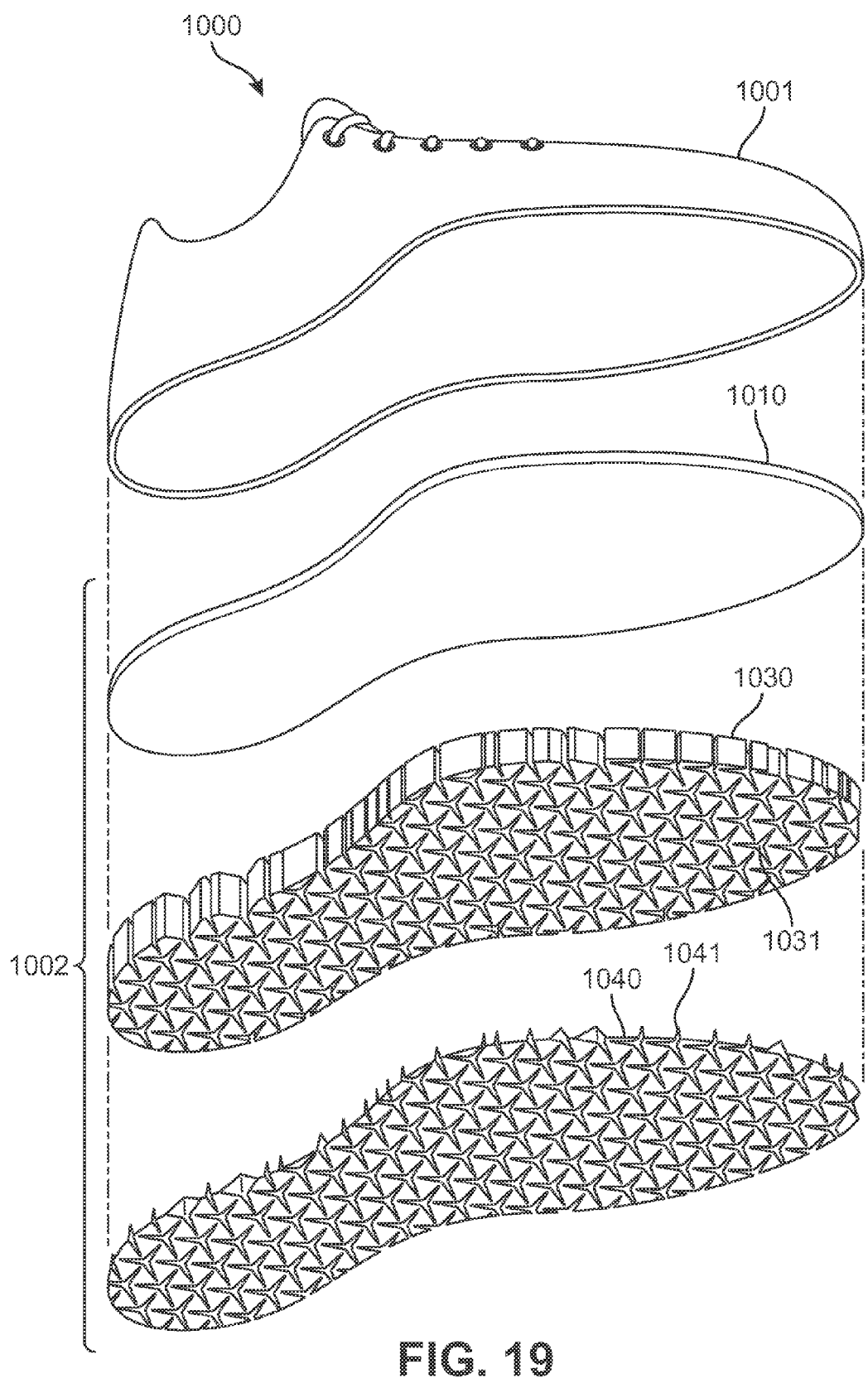
FIG. 19 is a schematic diagram showing an exploded view of another embodiment of an article of footwear.

In other embodiments, such as in the example shown in an exploded view in FIG. 19, the article of footwear 1000 has an upper 1001 attached to a sole structure 1002. Sole structure 1002 may have an insole 1010, and an auxetic outsole liner 1040 positioned below auxetic midsole 930. The projections 1041 in auxetic outsole liner 1040 are configured to match and mate with apertures 1031 in auxetic midsole 1030. Auxetic outsole liner 1040 may be fabricated from an abrasion-resistant elastomeric polymer. Such a polymer may be used to protect auxetic midsole 1030 when auxetic midsole 1030 is made from a material that is not as abrasion-resistant.

The auxetic structures used for the auxetic outsoles or auxetic midsoles shown in these figures can be manufactured by molding a conventional polymer foam (such as EVA, rubber, polyurethane or thermoplastic polyurethane) to have the pattern of joined triangles, other polygons or other geometries with triangular, polygonal or other shape apertures as described herein. The structures could also be manufactured by casting a solid polymer sheet and cutting the desired patterns into the sheet. For example, the auxetic structures may be produced by molding a polymer to have the desired pattern, or may be produced by cutting the patterns into a polymer sheet.

The auxetic liners, outsole liners and insole liners may be manufactured by molding or embossing an elastomeric polymer, such as rubber, butadiene or other elastomer into the desired shape. The insole liner may also be fabricated from a material that is not necessarily abrasion-resistant, such as polyvinylidene chloride.

The descriptions above have described auxetic structures using geometric patterns formed of hinged triangles that have openings that increase in both length and width when under longitudinal tension and also increase in both width and length when under lateral tension. These structures could also be formed using auxetic foam material, which is a material with a negative Poisson's ratio, such that the resulting structure expands in the direction orthogonal to an applied tension both because of its structural properties and because the material itself is intrinsically auxetic.

The present embodiments depict auxetic structures that have a substantial thickness in comparison to some other kinds of auxetic materials. Generally, the thickness of an auxetic structure, such as an outsole or a midsole comprising an auxetic structure, can vary. In some embodiments, an auxetic structure forming part of a sole structure may have a thickness in the range of one to five millimeters. In some embodiments, an auxetic structure can have a thickness greater than five millimeters and less than ten millimeters. In some embodiments, an auxetic structure can have a thickness greater than ten millimeters. Moreover, the thickness of the auxetic structure can be selected in order to achieve desired properties such as cushioning and support.

While various embodiments have been described, the description is intended to be exemplary, rather than limiting and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims.

What is claimed is:

1. An article of footwear comprising:
    a sole structure comprising an auxetic layer and a first liner,
    wherein the auxetic layer includes a pattern of apertures formed by sole elements surrounding the apertures;
    wherein each of the sole elements has a plurality of vertices;
    wherein the sole elements are joined at their vertices, and wherein the sole elements can rotate with respect to one another about their vertices;
    wherein the auxetic layer is characterized by having a lateral direction, a longitudinal direction and a vertical direction;
    wherein the auxetic layer is configured to expand in the lateral direction and the longitudinal direction when tension is applied to the auxetic layer in the lateral direction;
    wherein the auxetic layer is configured to expand in the lateral direction and the longitudinal direction when tension is applied to the auxetic layer in the longitudinal direction;
    wherein the apertures comprise openings on opposite sides of the auxetic layer that extend through the auxetic layer in the vertical direction;
    wherein the first liner comprises a continuous sheet of material that is disposed adjacent to the auxetic layer, wherein the first liner is approximately parallel to the auxetic layer and wherein the first liner inhibits the introduction of debris into the openings of the apertures in the auxetic layer;
    wherein the first liner is an auxetic liner that comprises an auxetic structure with projections that mate with and fit into the apertures in the auxetic layer; and
    wherein the projections extend through the openings of the apertures through the vertical direction of the auxetic layer.

2. The article of footwear according to claim 1, wherein the sole elements have a polygonal geometry.

3. The article of footwear according to claim 1, wherein the apertures are polygonal apertures that have reentrant sides.

4. The article of footwear according to claim 1, wherein each of the apertures has a center, and wherein when a portion of the auxetic layer is under vertical compression, the sole elements in the portion of the auxetic layer are forced towards the center of the apertures.

5. The article of footwear according to claim 1, wherein a shape of the projections matches the shape of the openings of the apertures.

6. The article of footwear according to claim 1, wherein the first liner is disposed on a first side of the auxetic layer, wherein the sole structure further comprises a second liner disposed on a second side of the auxetic layer that is opposite to the first side of the auxetic layer.

7. The article of footwear according to claim 1, wherein the auxetic layer is an auxetic outsole.

8. The article of footwear according to claim 1, wherein the auxetic layer is an auxetic midsole.

9. The article of footwear according to claim 1, wherein the first liner is disposed inwardly of the outsole, further comprising a second liner disposed outwardly of the outsole.

10. An article of footwear comprising:
    an auxetic layer and an auxetic liner,
    wherein the auxetic layer includes a pattern of apertures formed by geometric features surrounding the apertures;
    wherein each of the geometric features has a plurality of vertices;
    wherein the geometric features are joined at their vertices such that the vertices function as hinges that allow the geometric features to rotate with respect to each other;
    wherein the auxetic layer and the auxetic liner are characterized by having a lateral direction, a longitudinal direction and a vertical direction;
    wherein when a portion of the auxetic layer is under lateral tension, it expands in both the lateral direction and the longitudinal direction, and when a portion of the auxetic layer is under longitudinal tension it expands in both the longitudinal direction and the lateral direction, and
    wherein when a portion of the auxetic liner is under lateral tension, it expands in both the lateral direction and the longitudinal direction, and when a portion of the auxetic liner is under longitudinal tension it expands in both the longitudinal direction and the lateral direction;
    wherein the apertures comprise openings on opposite sides of the auxetic layer that extend through the auxetic layer in the vertical direction;
    wherein the auxetic liner comprises a continuous sheet of material that includes projections;

wherein the auxetic liner is disposed on a first surface of the auxetic layer and mates with the auxetic layer; and wherein the projections are shaped to fit into the openings of the apertures and extend through the apertures in the vertical direction to mate the auxetic liner with the auxetic layer.

11. The article of footwear according to claim 10, further comprising a flat outsole liner disposed on a second surface of the auxetic layer that is opposite to the first surface of the auxetic layer.

12. The article of footwear according to claim 11, wherein the flat outsole liner is disposed outwardly of the auxetic layer.

13. The article of footwear according to claim 10, wherein the auxetic liner is disposed outwardly of the auxetic layer.

14. The article of footwear according to claim 10, wherein the geometric features are polygonal features.

15. The article of footwear according to claim 10, wherein the geometric features are triangular features.

16. An article of footwear comprising:

an upper and a sole structure attached to the upper, wherein the sole structure comprises an auxetic layer and a first liner, wherein the auxetic layer comprises a pattern of apertures formed by geometric features surrounding the apertures;

wherein the geometric features are joined at their vertices such that they function as hinges thereby allowing the geometric features to rotate with respect to each other;

wherein the auxetic layer is characterized by having a lateral dimension and a longitudinal dimension;

wherein when the auxetic layer is in an unstressed state, the auxetic layer is characterized by having an unstressed configuration with an unstressed longitudinal dimension and an unstressed lateral dimension, and when the auxetic layer is under tension the auxetic layer has an expanded configuration with an expanded longitudinal dimension and an expanded lateral dimension, wherein the expanded longitudinal dimension is greater than the unstressed longitudinal dimension and wherein the expanded lateral dimension is greater than the unstressed lateral dimension;

wherein when the auxetic layer is under tension, the first liner expands simultaneously with the auxetic layer such that the expansion of the first liner is compatible with the expansion of the auxetic layer;

wherein the apertures in the auxetic layer comprise openings on opposite sides of the auxetic layer that extend through the auxetic layer in a vertical direction; and wherein the first liner comprises a continuous sheet of material that includes projections that extend through the openings of the apertures in the vertical direction of the auxetic layer.

17. The article of footwear according to claim 16, wherein the first liner is an auxetic liner that mates with the auxetic layer and conforms to the auxetic layer.

18. The article of footwear according to claim 17, wherein the first liner is made of a resilient and elastic material.

19. The article of footwear according to claim 16, wherein the first liner is a flat, elastic and resilient liner.

20. The article of footwear according to claim 16, further comprising a second liner disposed adjacent to and parallel to a second surface of the auxetic layer.

* * * * *